(12) United States Patent  
Krishnan et al.

(10) Patent No.: US 11,902,343 B1  
(45) Date of Patent: Feb. 13, 2024

(54) SYSTEM AND METHOD FOR HIGHLY SCALABLE BROWSER-BASED AUDIO/VIDEO CONFERENCING

(71) Applicant: Damaka, Inc., Richardson, TX (US)

(72) Inventors: Rajaraman Krishnan, Chennai (IN); Rashmi Lohita, Allen, TX (US); Channamallesh G. Hiremath, Allen, TX (US); Sivakumar Chaturvedi, Allen, TX (US)

(73) Assignee: Damaka, Inc., Richardson, TX (US)

( * ) Notice: Subject to any disclaimer, the term of this patent is extended or adjusted under 35 U.S.C. 154(b) by 0 days.

(21) Appl. No.: 17/723,572

(22) Filed: Apr. 19, 2022

Related U.S. Application Data

(60) Provisional application No. 63/176,419, filed on Apr. 19, 2021.

(51) Int. Cl.  
  *H04L 65/403* (2022.01)
(52) U.S. Cl.  
  CPC .................. *H04L 65/403* (2013.01)
(58) Field of Classification Search  
  CPC ......... H04L 65/403; H04N 7/15; H04N 7/147  
  USPC ............................. 348/14.01–14.16  
  See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,195,694 B1 | 2/2001 | Chen et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,389,016 B1 | 5/2002 | Sabaa et al. |

(Continued)

FOREIGN PATENT DOCUMENTS

| | | |
|---|---|---|
| EP | 1603339 A1 | 12/2005 |
| EP | 1638275 A2 | 3/2006 |

(Continued)

OTHER PUBLICATIONS

Live Broadcast Stream Push Method, Device and Electronic Device Document ID KR 20220139393 A Date Published (XiaHou Jiaxi).*

(Continued)

*Primary Examiner* — Melur Ramakrishnaiah

(57) ABSTRACT

A system and method for managing a conference call using a selective transmission unit (STU) to manage multiple client devices participating in the conference call. In one example, the STU uses video transmission parameters and video reception parameters from each of the client devices to control which video streams are sent by the client devices to the STU. The STU then sends particular received video streams to each of the client devices based on the video reception parameters of the respective client device.

17 Claims, 18 Drawing Sheets

(56) References Cited

U.S. PATENT DOCUMENTS

| | | |
|---|---|---|
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 | 8/2003 | Falco |
| 6,741,691 B1 | 5/2004 | Ritter et al. |
| 6,754,181 B1 | 6/2004 | Elliott et al. |
| 6,766,373 B1 | 7/2004 | Beadle et al. |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,407,314 B2 | 3/2013 | Chaturvedi et al. |
| 8,407,576 B1 | 3/2013 | Yin et al. |
| 8,560,642 B2 | 10/2013 | Pantos et al. |
| 8,611,540 B2 | 12/2013 | Chaturvedi et al. |
| 9,143,489 B2 | 9/2015 | Chaturvedi et al. |
| 9,237,140 B1 | 1/2016 | Lerner et al. |
| 9,356,997 B2 | 5/2016 | Chaturvedi et al. |
| 9,742,846 B2 | 8/2017 | Chaturvedi et al. |
| 10,027,926 B1 * | 7/2018 | Schirdewahn ......... H04W 4/02 |
| 10,091,258 B2 | 10/2018 | Carter et al. |
| 10,097,638 B2 | 10/2018 | Chaturvedi et al. |
| 10,834,256 B1 | 11/2020 | Nair et al. |
| 10,887,549 B1 | 1/2021 | Wehrung et al. |
| 10,924,709 B1 | 2/2021 | Faulkner et al. |
| 11,107,490 B1 | 8/2021 | Slotznick |
| 11,315,158 B1 | 4/2022 | Lidster et al. |
| 2003/0164853 A1 | 9/2003 | Zhu et al. |
| 2004/0141005 A1 | 7/2004 | Banatwala et al. |
| 2005/0071678 A1 | 3/2005 | Lee et al. |
| 2005/0147212 A1 | 7/2005 | Benco et al. |
| 2006/0195519 A1 | 8/2006 | Slater et al. |
| 2006/0233163 A1 | 10/2006 | Celi et al. |
| 2007/0003044 A1 | 1/2007 | Liang et al. |
| 2008/0037753 A1 | 2/2008 | Hofmann |
| 2009/0282251 A1 | 11/2009 | Cook et al. |
| 2009/0319916 A1 | 12/2009 | Gudipaty et al. |
| 2010/0064344 A1 | 3/2010 | Wang |
| 2010/0299529 A1 | 11/2010 | Fielder |
| 2011/0044211 A1 | 2/2011 | Long et al. |
| 2011/0145687 A1 | 6/2011 | Grigsby et al. |
| 2011/0279640 A1 * | 11/2011 | Choi ................... H04N 7/147 348/14.12 |
| 2011/0289155 A1 | 11/2011 | Pirnazar |
| 2012/0064976 A1 | 3/2012 | Gault et al. |
| 2014/0096036 A1 | 4/2014 | Mohler |
| 2014/0340468 A1 | 11/2014 | Winterstein |
| 2015/0195096 A1 | 7/2015 | Anka |
| 2015/0295777 A1 | 10/2015 | Cholkar et al. |
| 2016/0057391 A1 | 2/2016 | Block et al. |
| 2016/0234264 A1 | 8/2016 | Coffman et al. |
| 2017/0013233 A1 * | 1/2017 | Kuusela ............... H04N 19/44 |
| 2017/0171280 A1 * | 6/2017 | Kim ...................... H04N 7/15 |
| 2017/0249394 A1 | 8/2017 | Loeb et al. |
| 2018/0012192 A1 | 1/2018 | Rosenberg |
| 2018/0176508 A1 | 6/2018 | Pell |
| 2019/0273767 A1 | 9/2019 | Nelson et al. |
| 2020/0274965 A1 | 8/2020 | Ravichandran |
| 2020/0301647 A1 | 9/2020 | Yoshida |
| 2020/0382618 A1 | 12/2020 | Faulkner et al. |
| 2021/0099574 A1 | 4/2021 | Nair et al. |
| 2022/0086197 A1 | 3/2022 | Lohita et al. |

FOREIGN PATENT DOCUMENTS

| | | |
|---|---|---|
| EP | 1848163 A1 | 10/2007 |
| EP | 1988698 A1 | 11/2008 |
| EP | 1404082 B1 | 10/2012 |
| EP | 1988697 B1 | 2/2018 |
| JP | 2005094600 A | 4/2005 |
| JP | 2005227592 A | 8/2005 |
| JP | 2007043598 A | 2/2007 |
| KR | 20050030548 A | 3/2005 |
| WO | 03079635 A1 | 9/2003 |
| WO | 2005009019 A2 | 1/2005 |
| WO | 2004063843 A3 | 3/2005 |
| WO | 2006064047 A1 | 6/2006 |
| WO | 2006075677 A1 | 7/2006 |
| WO | 2008099420 A3 | 12/2008 |

OTHER PUBLICATIONS

Balamurugan Karpagavinayagam et al. (Monitoring Architecture for Lawful Interception in VoIP Networks, ICIMP 2007, (Aug. 24, 2008).

Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.

Chathapuram, "Security in Peer-To-Peer Networks", Aug. 8, 2001, XP002251813.

Cooper et al; "NAT Traversal for dSIP"; Feb. 25, 2007; IETF; IETF draft draft-matthews-p2psip-dsip-nat-traversal-00; pp. 1-23.

Cooper et al; "The Effect of NATs on P2PSIP Overlay Architecture"; IETF; IETF draft draft-matthews-p2psip-nats-and-overlays-01.txt; pp. 1-20.

Dunigan, Tom, "Almost TCP over UDP (atou)," last modified Jan. 12, 2004; retrieved on Jan. 18, 2011 from 18 pgs.

Hao Wang, Skype VoIP service-architecture and comparison, In: INFOTECH Seminar Advanced Communication Services (ASC), 2005, pp. 4, 7, 8.

Isaacs, Ellen et al., "Hubbub: A sound-enhanced mobile instant messenger that supports awareness and opportunistic interactions," Proceedings of the SIGCHI Conference on Human Factors in

(56) References Cited

OTHER PUBLICATIONS

Computing Systems; vol. 4, Issue No. 1; Minneapolis, Minnesota; Apr. 20-25, 2002; pp. 179-186.

J. Rosenberg et al., SIP: Session Initiation Protocol (Jun. 2008) retrieved at http://tools.ietf.org/html/rfc3261. Relevant pages provided.

J. Rosenberg et al. " Session Traversal Utilities for NAT (STUN)", draft-ietf-behave-rfc3489bis-06, Mar. 5, 2007.

Jeff Tyson, "How Instant Messaging Works", www.verizon.com/learningcenter, Mar. 9, 2005.

Mahy et al., The Session Initiation Protocol (SIP) "Replaces" Header, Sep. 2004, RFC 3891, pp. 1-16.

NiceLog User's Manual 385A0114-08 Rev. A2, Mar. 2004.

Pejman Khadivi, Terence D. Todd and Dongmei Zhao, "Handoff trigger nodes for hybrid IEEE 802.11 WLAN/cellular networks," Proc. Of IEEE International Conference on Quality of Service in Heterogeneous Wired/Wireless Networks, pp. 164-170, Oct. 18, 2004.

Philippe Bazot et al., Developing SIP and IP Multimedia Subsystem (IMS) Applications (Feb. 5, 2007) retrieved at redbooks IBM form No. SG24-7255-00. Relevant pages provided.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

RFC 5694 ("Peer-to-Peer (P2P) Architecture: Definition, Taxonomies, Examples, and Applicability", Nov. 2009).

Rory Bland, et al,"P2P Routing" Mar. 2002.

Rosenberg, "STUN-Simple Traversal of UDP Through NAT", Sep. 2002, XP015005058.

Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.

Salman A. Baset, et al, "An Analysis of the Skype Peer-To-Peer Internet Telephony Protocol", Department of Computer Science, Columbia University, New York, NY, USA, Sep. 15, 2004.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet ].

Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.

T. Dierks & E. Rescorla, The Transport Layer Security (TLS) Protocol (Ver. 1.2, Aug. 2008) retrieved at http://tools.ietf.org htmllrfc5246. Relevant pages provided.

Wireless Application Protocol—Wireless Transport Layer Security Specification, Version Feb. 18, 2000, Wireless Application Forum, Ltd. 2000; 99 pages.

WISPA: Wireless Internet Service Providers Association; WISPA-CS-IPNA-2.0; May 1, 2009.

\* cited by examiner

|   |   |   |   |
|---|---|---|---|
| 1 |   | 6 | 7 |
|   |   | 8 | 9 |
| 2 | 4 | 10 | 11 |
| 3 | 5 | 12 | 13 |

|  1 | 10 | 12 | 14 |
|----|----|----|----|
|  9 | 11 | 13 |    |

FIG. 11C  1100

|  9 |  1 | 12 | 14 |
|----|----|----|----|
| 10 | 11 | 13 |    |

FIG. 11D  1100

SYSTEM AND METHOD FOR HIGHLY SCALABLE BROWSER-BASED AUDIO/VIDEO CONFERENCING

CROSS-REFERENCE TO RELATED APPLICATIONS

This application claims the benefit of U.S. Provisional Application 63/176,419, filed on Apr. 19, 2021, and entitled SYSTEM AND METHOD FOR HIGHLY SCALABLE BROWSER-BASED AUDIO/VIDEO CONFERENCING, which is incorporated by reference herein in its entirety.

BACKGROUND

The manner in which communication sessions with remote parties occur is currently limited in functionality and flexibility. Accordingly, what is needed are a system and method that addresses these issues.

SUMMARY

In one example embodiment, a method for managing a conference call using a selective transmission unit (STU) to manage a plurality of client devices participating in the conference call includes receiving, by a selective transmission unit (STU), video transmission parameters from each of a plurality of client devices, receiving, by the STU, video reception parameters from each of the client devices, instructing, by the STU, a first client device of the plurality of client devices to start transmitting a first video stream at a first resolution based on at least some of the video transmission parameters and the video reception parameters, receiving, by the STU, the first video stream, and forwarding the first video stream to at least a second client device of the client devices based on the video reception parameters of the second client device.

In one or more of the above examples, the method further includes determining, by the STU, that a second video stream from a third client device is not being viewed by any of the other client devices, and instructing, by the STU, the third client device to stop sending the second video stream.

In one or more of the above examples, the method further includes determining, by the STU, that a second video stream having a second resolution is desired from the first client device, instructing, by the STU, the first client device to start transmitting the second video stream, receiving, by the STU, the second video stream, and forwarding the second video stream to at least one of the other client devices based on the video reception parameters of the respective client device.

In one or more of the above examples, the method further includes determining, by the STU, that the second video stream is not being received from the first client device prior to instructing the first client device to start transmitting the second video stream.

In one or more of the above examples, determining that a second video stream having a second resolution is desired from the first client device occurs when a request for the second resolution is received from one of the other client devices.

In one or more of the above examples, the method further includes receiving, by the STU, a modification of the video reception parameters from the second client device, wherein the modification requests a second video stream having a second resolution from the first client device, determining, by the STU, that the second video stream is already being received from the first client device, and forwarding the second video stream to the second client device.

In one or more of the above examples, the method further includes monitoring, by the STU, a network performance level associated with the first client device, and modifying, by the STU, at least one of a video stream being received from the first client device or a video stream being sent to the first client device based on the network performance level.

In one or more of the above examples, the STU manages the conference call by communicating only with a browser on each of the client devices, and wherein the client devices do not communicate with the STU using an application other than the browser and do not use any browser plug-ins to communicate with the STU for the conference call.

In another example embodiment, a method for managing a conference call using a selective transmission unit (STU) to manage a plurality of client devices participating in the conference call includes receiving, by a selective transmission unit (STU), video transmission parameters and video reception parameters from each of a plurality of client devices, managing, by the STU, a plurality of video streams received by the STU from the client devices, wherein the managing includes controlling a resolution of each video stream being received from the client devices based on the video transmission parameters and video reception parameters, and managing, by the STU, which of the received video streams are sent to each of the client devices based on the video reception parameters of the respective client device.

In one or more of the above examples, managing the plurality of video streams received by the STU from the client devices includes instructing at least one of the client devices to stop sending a video stream having a particular resolution.

In one or more of the above examples, managing the plurality of video streams received by the STU from the client devices includes instructing at least one of the client devices to start sending a video stream having a particular resolution.

In one or more of the above examples, the method further includes monitoring, by the STU, a network performance level associated with a first client device of the client devices, and modifying, by the STU, at least one of a video stream being received from the first client device or a video stream being sent to the first client device based on the network performance level.

In one or more of the above examples, the method further includes receiving, by the STU, a change in the video reception parameters of a first client device of the client devices, and modifying, by the STU, a video stream being sent to the first client device based on the change.

In one or more of the above examples, the STU communicates with at least one of the client devices for the conference call using only a browser present on the client device, and wherein the client device does not communicate with the STU using an application other than the browser and does not use any browser plug-ins to communicate with the STU for the conference call.

In another example embodiment, a system for managing a conference call includes a server having a processor and a memory coupled to the processor, the memory containing a plurality of instructions for execution by the processor, the instructions including instructions for providing a selective transmission unit (STU) and configuring the STU for receiving video transmission parameters and video reception parameters from each of a plurality of client devices, managing a plurality of video streams received by the STU from the client devices, wherein the managing includes controlling a resolution of each video stream being received from the client devices based on the video transmission parameters and video reception parameters, and managing which of the received video streams are sent to each of the client devices based on the video reception parameters of the respective client device.

In one or more of the above examples, the instructions for managing the plurality of video streams received by the STU from the client devices include instructions for instructing at least one of the client devices to stop sending a video stream having a particular resolution.

In one or more of the above examples, the instructions for managing the plurality of video streams received by the STU from the client devices include instructing at least one of the client devices to start sending a video stream having a particular resolution.

In one or more of the above examples, the system further includes instructions for monitoring, by the STU, a network performance level associated with a first client device of the client devices, and modifying, by the STU, at least one of a video stream being received from the first client device or a video stream being sent to the first client device based on the network performance level.

In one or more of the above examples, the system further includes instructions for receiving, by the STU, a change in the video reception parameters of a first client device of the client devices, and modifying, by the STU, a video stream being sent to the first client device based on the change.

In one or more of the above examples, the STU is configured to communicate with at least one of the client devices for the conference call using only a browser present on the client device, and wherein the client device does not communicate with the STU using an application other than the browser and does not use any browser plug-ins to communicate with the STU for the conference call.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding, reference is now made to the following description taken in conjunction with the accompanying Drawings in which:

FIGS. 8A-9A illustrate embodiments of GUIs and GUI management grids that may be used by a client device of FIG. 1;

FIGS. 10-11D illustrate embodiments of GUIs and GUI management grids that may be used by a client device of FIG. 1;

DETAILED DESCRIPTION

Figure 1:
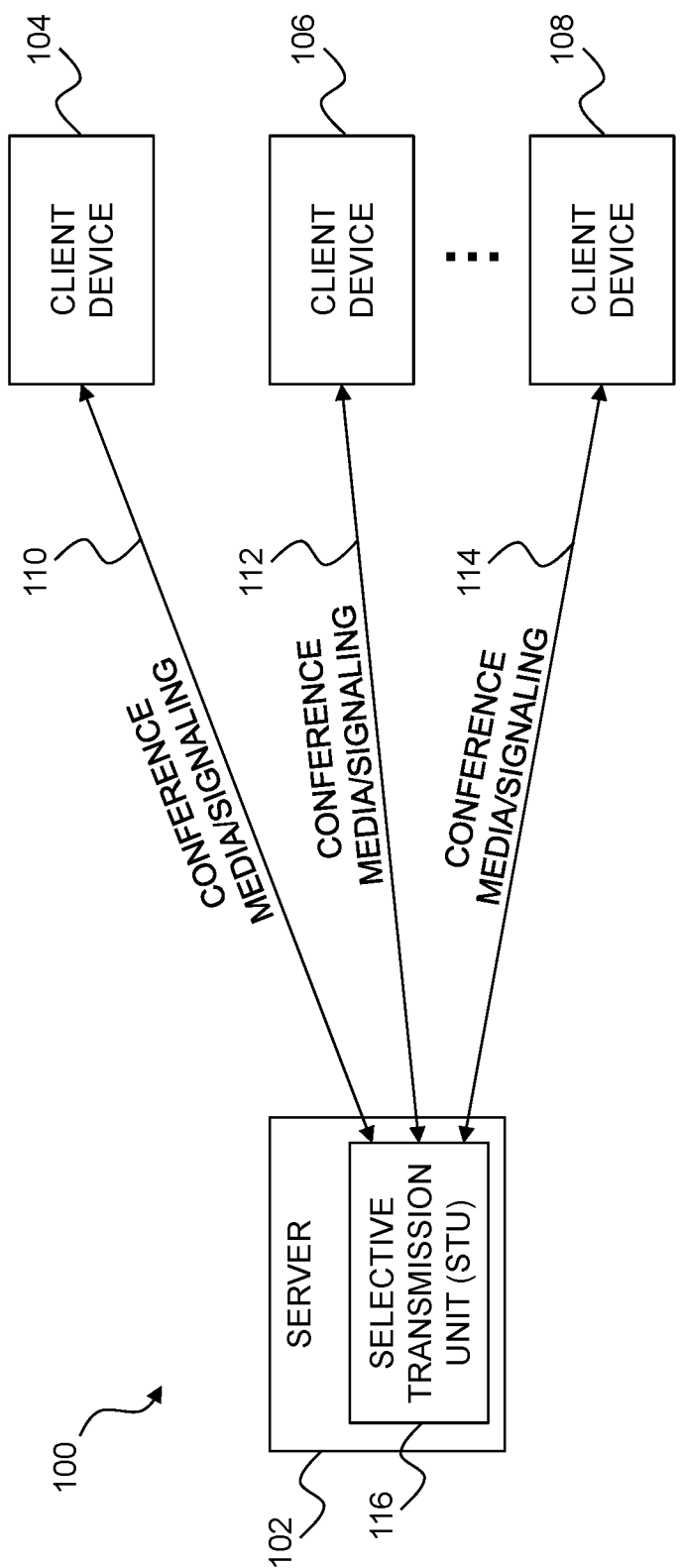
FIG. 1 illustrates one embodiment of an environment within which a selective transmission unit (STU) may manage a conference call with multiple client devices.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of an environment 100 is illustrated within which various aspects of the present disclosure may be practiced. The environment 100 includes a server 102 that has established simultaneous communication sessions for a conference call with a client device 104, a client device 106, and a client device 108. The server 102 is coupled to the client device 104 via one or more media and signaling channels 110, to the client device 106 via one or more media and signaling channels 112, and to the client device 108 via one or more media and signaling channels 114. Although only three client devices are illustrated, it is understood that any number of client devices may be in communication with the server 102, subject to technical limitations such as bandwidth, processing power, and/or similar factors. For purposes of example, the number of client devices that may be simultaneously connected to the server 102 for a single conference call may approach or surpass one thousand.

The server 102 includes one or more selective transmission units (STUs) 116. As is known, some media control units (MCUs) operate by merging video streams for a conference call or other media session, and then forwarding the merged video stream to the clients. However, the merging of the video streams prevents the streams from being independently manipulated by the clients and prevents more granular control by the MCU. Selective forwarding units (SFUs) use an architecture for conferencing servers where the server does not merge videos, but instead forwards the video streams based on which client is interested in viewing which video stream. However, an SFU may receive multiple video streams of different resolutions from a single client, and then forward the desired video stream to each of the other clients. As the SFU may have no way to control the video streams sent from each client, unnecessary resources (e.g., bandwidth and processing resources) may be used for sending, receiving, and processing video streams that are not needed or desired, which may in turn reduce the number of client devices that can be involved in a single conference call.

In contrast, the STU 116 of the present disclosure extends the SFU architecture to provide additional granularity and control over the video streams by enabling the server 102 to interact with the client devices and control individual video streams sent by the client devices. As the number of participants in a conference call increases, the STU 116 may reduce the resolution of some video streams based on the available network bandwidth, the number of participants, whether one or more users are being viewed in larger windows, etc. This enables the STU 116 to scale the conference call dynamically based on the number of participants and the available resources.

The client devices 104, 106, and 108 may be mobile devices (e.g., tablets, smartphones, personal digital assistants (PDAs), or netbooks), laptops, desktops, workstations, smart televisions, and/or any other computing device capable of receiving and sending electronic communications via a wired or wireless network connection. Such communications may be direct (e.g., via a peer-to-peer network, an ad hoc network, or using a direct connection), indirect, such as through a server or other proxy (e.g., in a client-server model), or may use a combination of direct and indirect communications.

Figure 2:
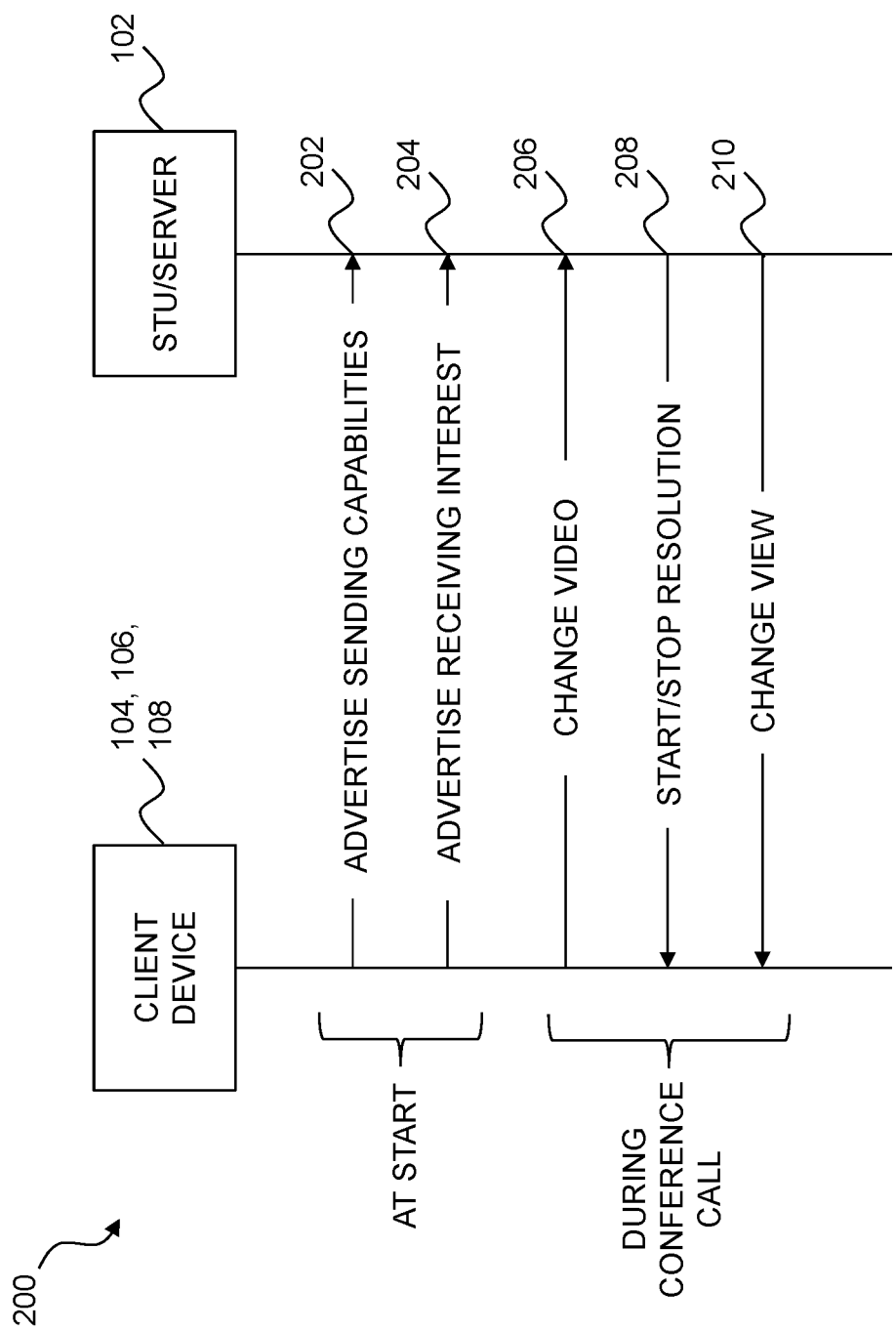
FIGS. 2-4 illustrate embodiments of sequence diagrams showing message flows that may occur within the environment of FIG. 1.

With additional reference to FIG. 2, a sequence diagram illustrates one embodiment of a message flow 200 that may be exchanged between the server 102/STU 116 and one of the clients 104, 106, and 108. It is understood that the illustrated messages need not be in the exact sequence shown, but steps 202 and 204 may generally occur before steps 206, 208, and 210. Some steps, such as steps 206, 208, and/or 210 may repeat during the conference call as different events occur, such as a user selecting a different view or the server 102 determining that a different video stream is needed or an existing video stream can be stopped.

Each client 104, 106, and 108 may have the ability to transmit at multiple resolutions and to receive multiple streams of video of different participants. Accordingly, the STU 116 includes logic to determine such factors as what resolution(s) each client device should use to send its video to the server 102, how many video streams each client device should receive from the server 102, and how many "small" videos and "large" videos should be sent to a client device.

With respect to which resolutions a client device should send to the server 102, various factors may be taken into account for both the sending client device and other client devices involved in the conference call. For example, the bandwidth available for sending video from the client device 104 affects the device's ability to stream higher quality video (e.g., a 480p video stream takes less bandwidth than a 1080p video stream). The client device's processing power, memory, camera resolution, available power, and/or other device attributes may also affect the client's ability to send video data. Accordingly, in step 202, the client device may advertise (e.g., send one or more messages) to the server 102 detailing certain sending capabilities of the client, such as available resolutions, framerates, etc. For example, the client device 104 may indicate that it can send video in 90p (160×90), 180p (320×180), 240p (352×240), 360p (640×360), 480p (720×480), 720p (1280×720), and 1080p (1920×1080). It is understood that the resolutions that may be sent may vary from device to device, and these are merely examples and are not intended to be limiting.

Another factor is how many video streams the server 102 should send to the client device, and how many of those streams should be "small" videos and "large" videos. Small videos may use lower resolution video, while large videos may use higher resolution video relative to small videos. The presentation of large and small videos may initially be based on user preferences. For example, the client device 104 may indicate that it wants "small" videos to be 720p, while it wants "large" videos to be 1080p. The client device 106 may indicate that it wants "small" videos to be 480p, while it wants "large" videos to be 720p. The client device 108 may indicate that it wants both "small" and "large" videos to be 480p. This enables each client device to establish its preferences, which may then be adjusted by the STU 116 based on factors such as available resolutions and bandwidth. Accordingly, in step 204, the client may advertise (e.g., send one or more messages) to the server 102 requesting certain large and/or small videos.

In some embodiments, a default video size may be sent initially (e.g., only small videos) and later adjustments may be made. Such adjustments may be made by the client device itself or by the STU 116. For example, in step 206, a change may be requested by the client that affects the grid windows being viewed, their respective sizes, etc., which may result in changes to the viewing grid and corresponding changes to received video streams (if needed).

In steps 208 and 210, the STU 116 may indicate that a particular resolution is to be stopped or started (step 208) or the view is to be changed (step 210). These steps may be based on information known to the STU 116 about how other client devices are viewing this user and/or based on changing network information (as will be described later in greater detail). For example, as will be discussed in greater detail below, a client device may be showing users in a grid (generally "small" videos), may have one user in a spotlight (a "large" video), etc. Accordingly, the resolution needed to display the client device's video stream in the manner selected by other client devices may be used to determine the resolution of the video stream sent by the client device. In some embodiments, a client device may not send any video stream to the STU 116 if no other client device is viewing the user of the sending client device.

Accordingly, to achieve the control desired for the different video streams, the STU 116 may track a number of items for each client device that is participating in the conference call. These items may include (1) the resolutions capable of being transmitted; (2) for each resolution being transmitted (and not transmitted) by the client device, the other client devices interested in that resolution; (3) the number of small videos (and their resolution) the client device is receiving and from which client devices those videos are being sent; and (4) the number of large videos (and their resolution) and from which client devices those videos are being sent. If a participant is interested in a higher resolution than what the participant is transmitting, the STU 116 may send the highest available resolution. For example, if the client device 104 wants to receive video at 1080p, but the highest resolution video from the client device 106 is 720p, then the server 102 will send the 720p video to the client device 104. It is understood that fewer or more items may be tracked for each client device, and some described items may be combined or further separated.

By tracking these items, the STU 116 may determine what video frames to forward to various participants. For example, when a 720p video frame arrives from the client device 104, the STU 116 would identify all participants who are interested in viewing this resolution or a higher resolution that is not being transmitted and send it to them. If the number of participants interested in viewing a particular resolution drops to zero, the STU 116 may instruct the client device to stop sending that resolution. It is understood that if no participants are interested in video of any resolution from a particular client device, that device may not send any video until at least one participant requests it. This tracking and video stream control of each participant provides the STU 116 with the ability to support very large conferences with every participant participating with audio and video. It may also reduce the utilization of resources (e.g., server/client CPU and network loads) for a given size and quality of meeting compared to the previously described MCU and SFU approaches, thereby resulting in more optimized conference calls.

Figure 3:
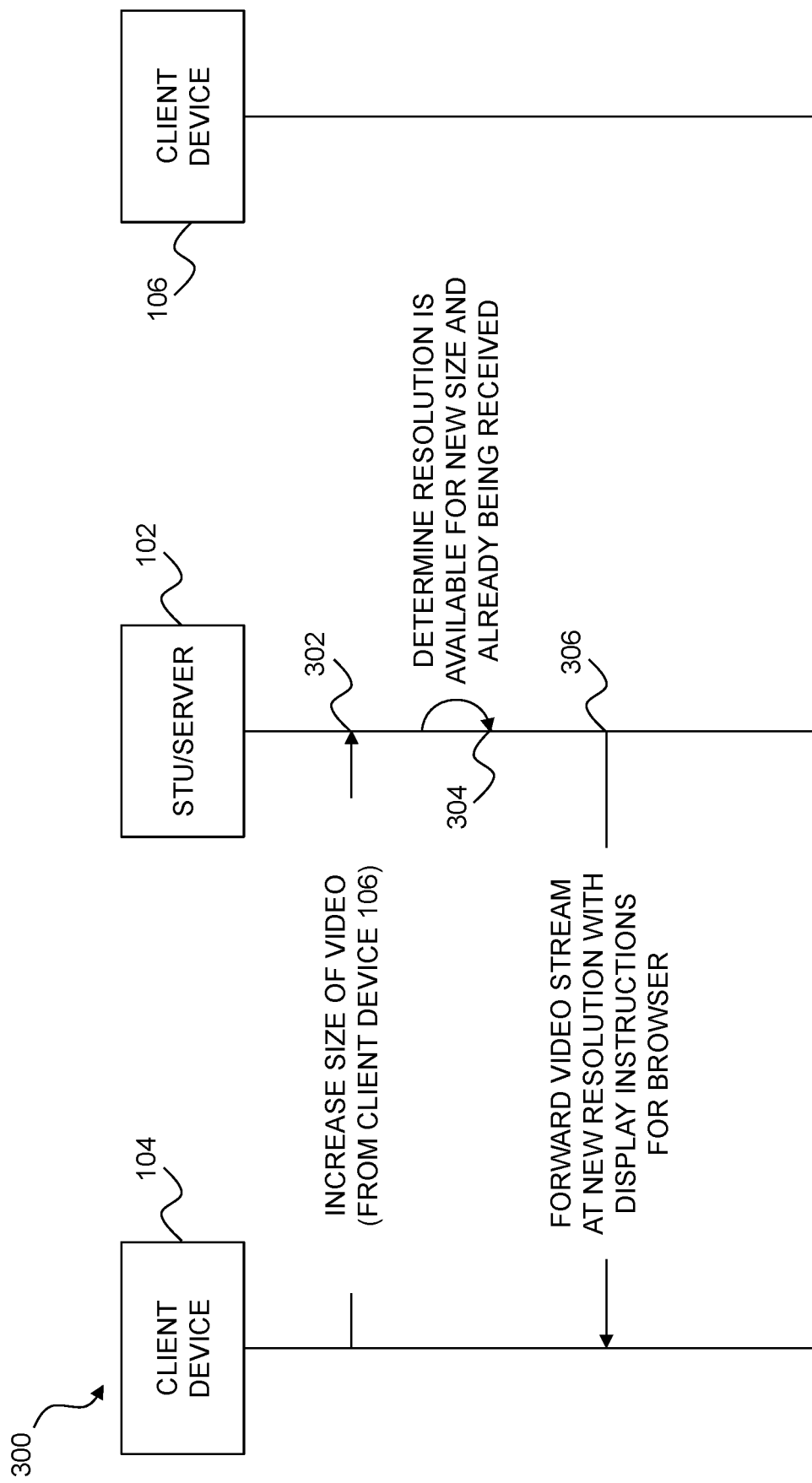
Figure 4:
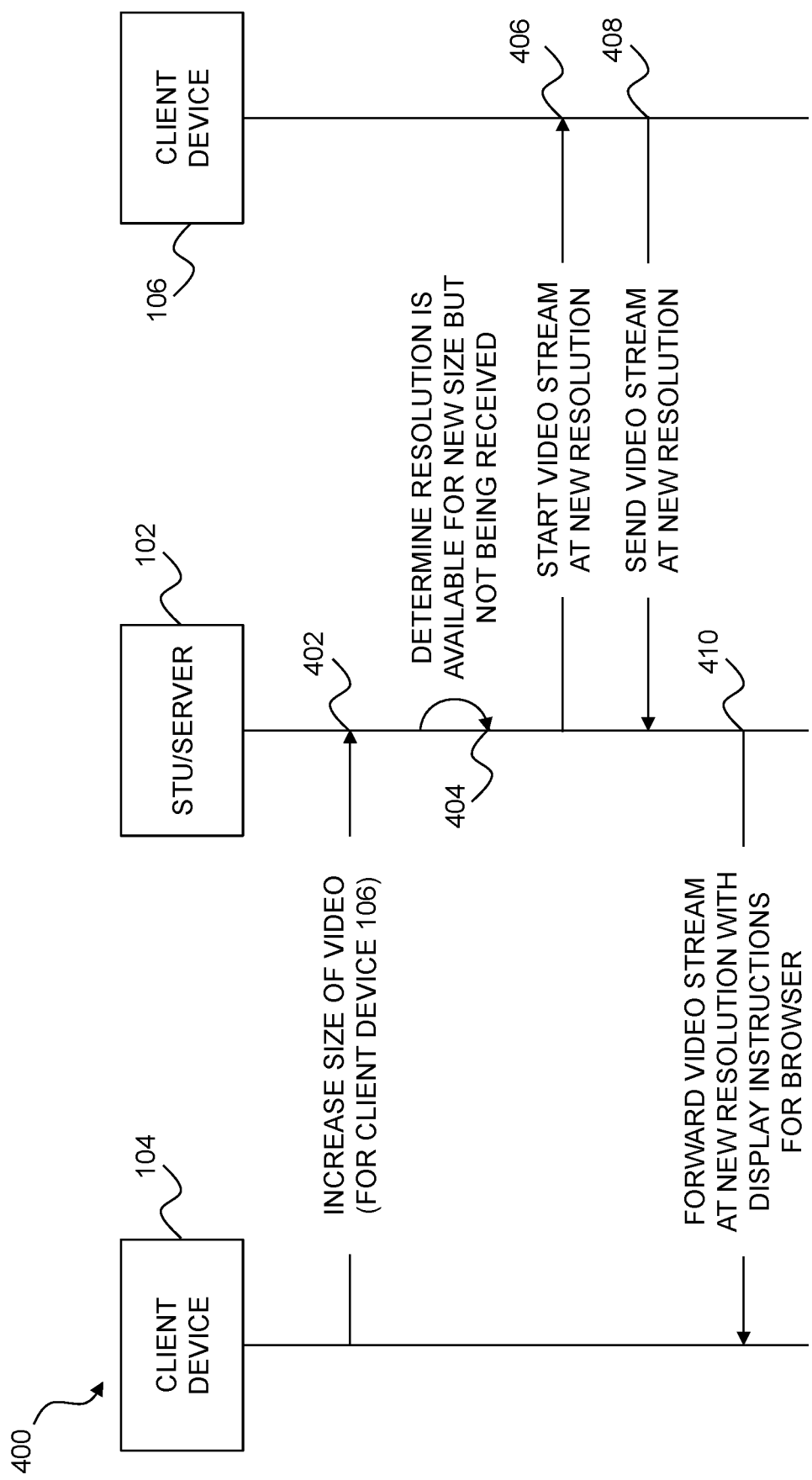

Referring to FIGS. 3 and 4, sequence diagrams illustrate embodiments of message flows 300 and 400, respectively. In FIG. 3, the client device 104 requests a larger video size in step 302, such as a spotlight on the video from the client device 106. In step 304, the STU 116 determines that the requested resolution is available (based on the client device's earlier parameter for a large video) and a video stream of that resolution is already being received from the client device 106. In step 306, the STU 116 forwards the higher resolution video to the client device 106 along with instructions for displaying the spotlight view in the browser window.

In FIG. 4, the client device 104 requests a larger video size in step 402, such as a spotlight on the video from the client device 106. In step 404, the STU 116 determines that the requested resolution is available (based on the client device's earlier parameter for a large video), but there is no video stream of that resolution currently being received from the client device 106. Accordingly, in step 406, the STU 116 instructs the client device 106 to begin streaming at the requested resolution and, in step 408, the client device 106 does so. In step 410, the STU 116 forwards the higher resolution video to the client device 104 along with instructions for displaying the spotlight view in the browser window.

While a client device may be capable of transmitting at a particular resolution (e.g., 720p), its ability to do so may be limited by network conditions and/or available bandwidth. In the present embodiment, the client device and the STU 116 may track the network conditions for that device in the conference call and, if needed, makes adjustments to the video streams for that particular client device. For example, both the client device and the STU 116 may monitor for errors in the incoming packets and take actions based on detected errors.

In the present embodiment, aspects on the error calculation may include: (1) computing errors across all video streams and audio streams, and averaging those errors on a time interval (e.g., every five seconds); (2) if the average error rate exceeds a certain percentage over a certain number of periods (e.g., five percent (5%) for three consecutive periods), a step-down action may be executed; (3) if the average error rate is below a certain percentage for a certain number of periods (e.g., one percent (1%) for three consecutive periods), a step-up action may be executed; (4) there may be no step-down timer (e.g., immediately after one step-down and three more time periods of five percent loss, there can be another step-down action); and/or (5) there may be a step-up timer (e.g., of a time interval of one minute or some other period), in which case after the execution of a step-down or step-up action, the next step-up action cannot be taken for a certain period of time (e.g., one minute). It is understood that these aspects may be varied in many ways, and this is only one possible set of actions that may be taken. For example, percentages may be increased or decreased, and time intervals may be lengthened or shortened, or may be implemented with a dynamic aspect such as a sliding window.

The parameters may be configurable for a particular conference call or as applied to the STU 116 and client devices in general. One possible implementation of the above aspects may be as follows:

One Time Period—Default 5 secs
Periods of Checking—Default 3
Error Threshold—Default 5%
No Error Threshold—Default 1%
Pause timer after an action—Default 1 min.

The values may evolve over time during a conference call. For example, the default values may be used at the call's start, and then gradually modified as the conference call becomes longer to ensure more rapid discovery of optimal parameters but no constant changes on intermittent errors.

The STU 116 may check for loss across all video streams and the audio stream for each participant and decide on whether to execute step-down or step-up actions. It may instruct the client device to take these actions through streamcontrol messages (e.g., via a signaling channel rather than Real-Time Transport Control Protocol (RTCP)). One possible implementation of step-up and step-down levels for the STU 116 may be as follows:

360P for full video (spotlight/VAD view) and 180p for small video (grid).
180P for full video (spotlight/VAD view) and 180p for small video (grid).
90P for full video (spotlight/VAD view) and 90p for small video (grid).
No Video Each client device may check for loss across all video streams and the audio stream and decide on whether to execute step-down or step-up actions. The client device may instruct the STU 116 to take these actions through changeview messages (e.g., via a signaling channel rather than RTCP). One possible implementation of step-up and step-down levels for a client device may be as follows and may vary depending on whether the user is in grid view or spotlight/VAD view.

For the spotlight/VAD view:
Spotlight/VAD View
360P max resolution
180P max resolution
90P max resolution
No video.

For the grid view:
Grid size of 16.
Grid size of 12.
Grid size of 9.
Grid size of 6.
Grid size of 4.
Grid size of 2.
Grid size of 1.
No video.

Figure 5:
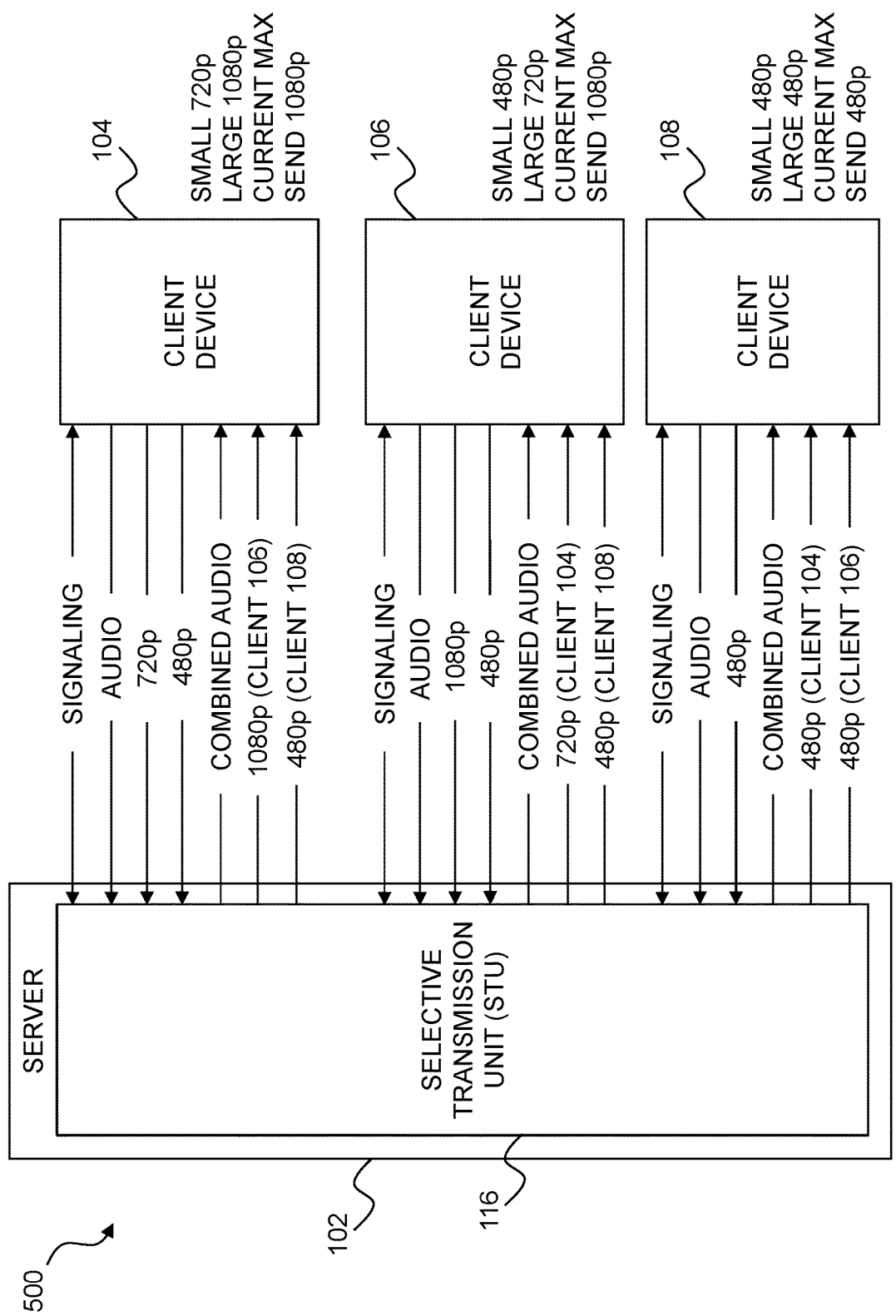
FIGS. 5-7 illustrate embodiments of media and signaling connections that may occur within the environment of FIG. 1.

Referring to FIG. 5, one embodiment of various signaling and media connections within the environment of FIG. 1 is illustrated. The media connections reflect the following Table 1, which illustrates various parameters tracked by the STU 116 for a conference call. In the present example, the client device 108 is capable of sending 720p, but is currently limited to 480p due to network conditions. As such, even though the small video parameter for the client device 104 is set to 720p, the STU 116 is only able to send the 480p video that is available from the client device 108.

TABLE 1

| Client device (participant) | Available transmission resolutions | Send resolution/ receiving client device | Small video(s)/ source client device | Large video(s)/ source client device |
|---|---|---|---|---|
| 104 | 90p 180p 240p 360p 480p 720p 1080p | 480p = client 108 720p = client 106 | Small (720p) = client 108 | Large (1080p) = client 106 |
| 106 | 90p 180p 240p 360p 480p 720p 1080p | 480p = client 108 1020p = client 104 | Small (480p) = client 108 | Large (720p) = client 104 |
| 108 | 90p 180p 240p 360p 480p 720p | 480p = clients 104, 106 | Small (480p) clients 104, 106 | |

Figure 6:
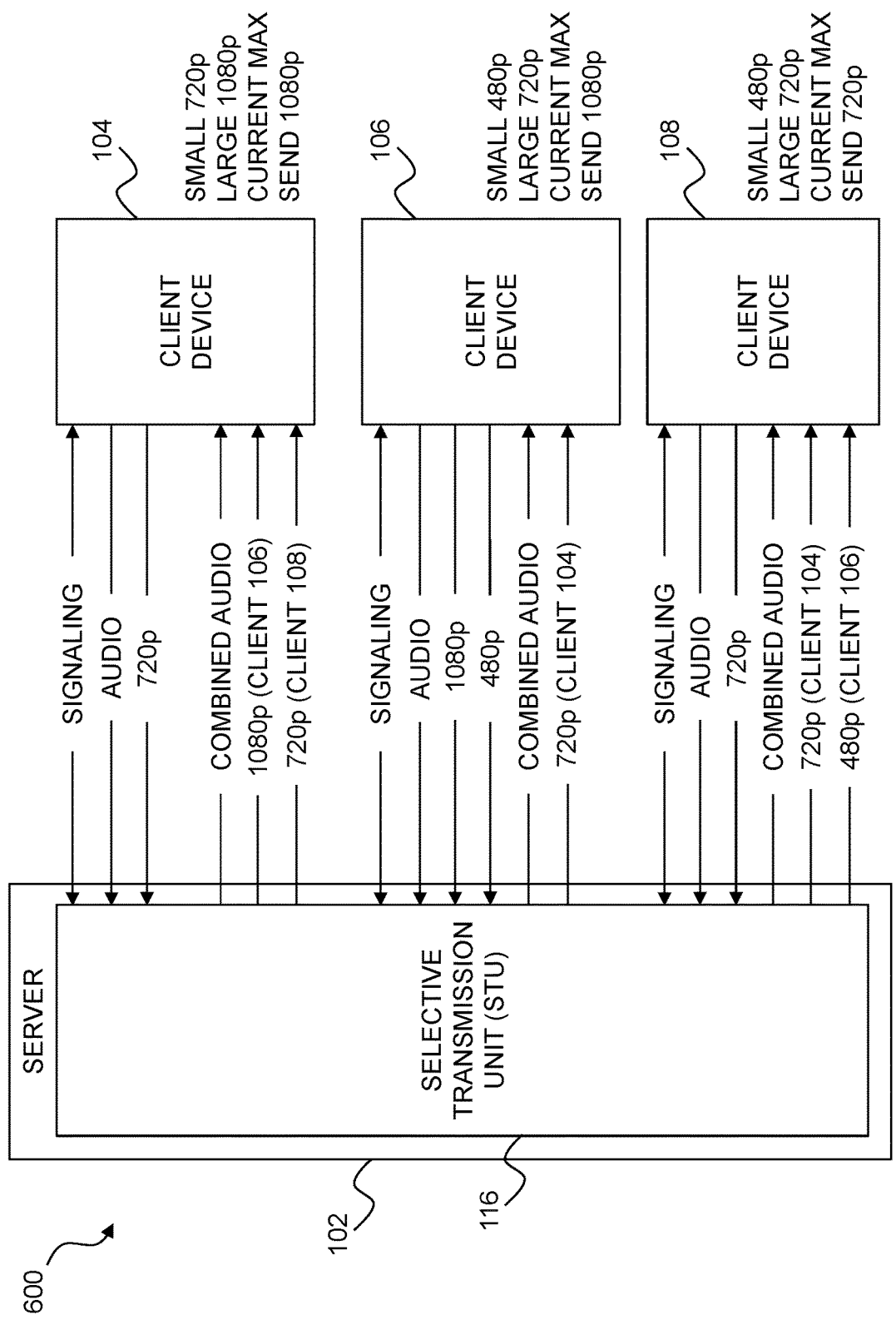

Referring to FIG. 6, one embodiment of various signaling and media connections within the environment of FIG. 1 is illustrated. The media connections reflect the following Table 2, which illustrates various parameters tracked by the STU 116 for a conference call. In Table 2, the currently available send resolution of the client device 108 has increased from 480p to 720p. This may occur, for example, due to changing network conditions that resulting in a step-up as previously described. The client device 108 has also increased the large video to 720p and is receiving the video from the client device 104 as large. The client device 106 is no longer viewing video from the client device 108.

TABLE 2

| Client device (participant) | Available transmission resolutions | Send resolution/ receiving client device | Small video(s)/ source client device | Large video(s)/ source client device |
|---|---|---|---|---|
| 104 | 90p 180p 240p 360p 480p 720p 1080p | 720p = clients 106, 108 | Small (720p) = client 108 | Large (1080p) = client 106 |
| 106 | 90p 180p 240p 360p 480p 720p 1080p | 480p = client 108 1020p = client 104 | | Large (720p) = client 104 |
| 108 | 90p 180p 240p 360p 480p 720p | 720p = clients 104, 106 | Small (480p) = client 106 | Large (720p) = client 104 |

Figure 7:
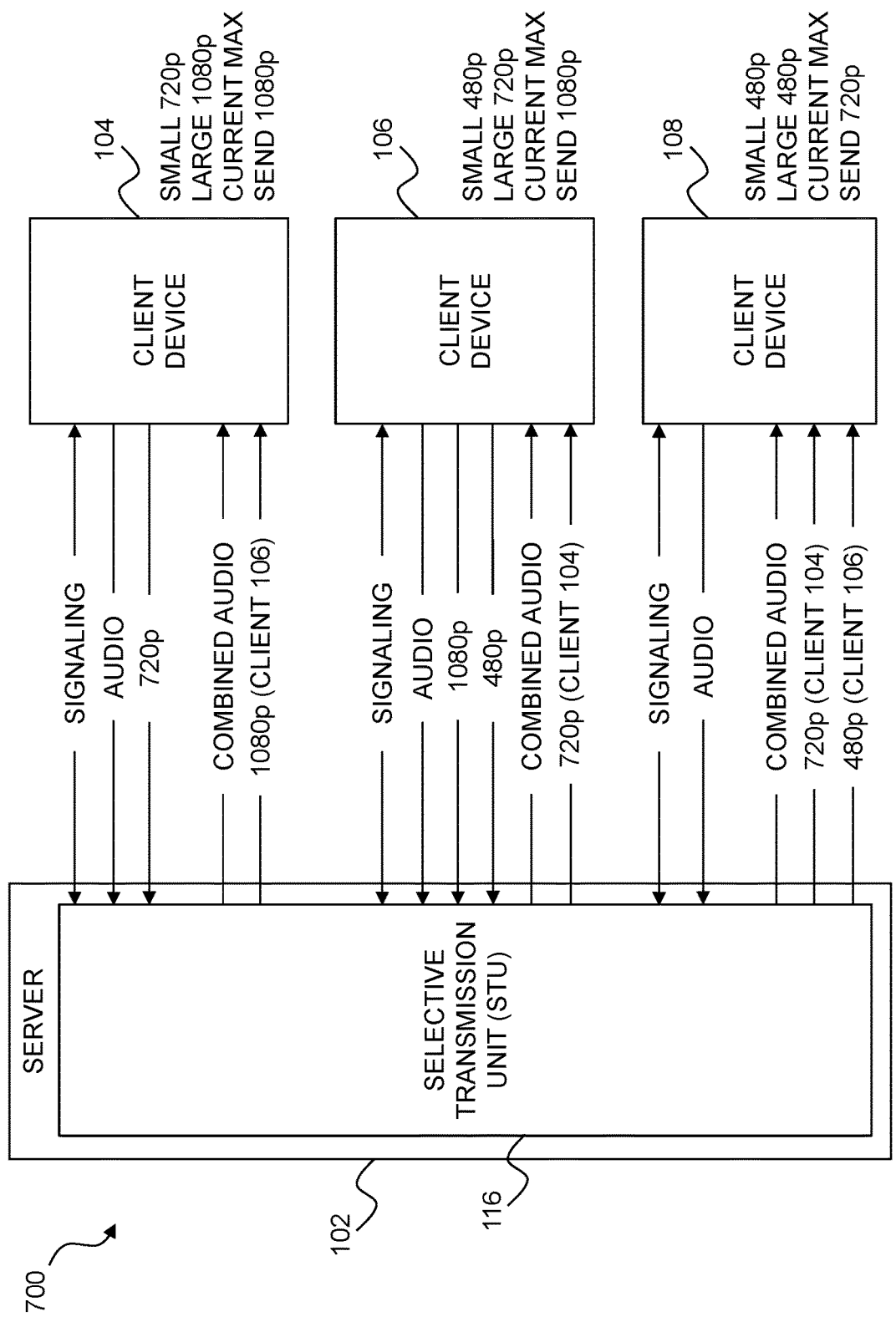

Referring to FIG. 7, one embodiment of various signaling and media connections within the environment of FIG. 1 is illustrated. The media connections reflect the following Table 3, which illustrates various parameters tracked by the STU 116 for a conference call. In Table 3, neither of the client devices 104 and 106 are viewing video from the client device 108, so the client device 108 is no longer sending video.

TABLE 3

| Client device (participant) | Available transmission resolutions | Send resolution/ receiving client device | Small video(s)/ source client device | Large video(s)/ source client device |
|---|---|---|---|---|
| 104 | 90p 180p 240p 360p 480p 720p 1080p | 720p = clients 106, 108 | | Large (1080p) = client 106 |
| 106 | 90p 180p 240p 360p 480p 720p 1080p | 480p = client 108 1020p = client 104 | | Large (720p) = client 104 |
| 108 | 90p 180p 240p 360p 480p 720p | 720p = clients 104, 106 | Small (480p) = client 106 | Large (720p) = client 104 |

Figure 8A:
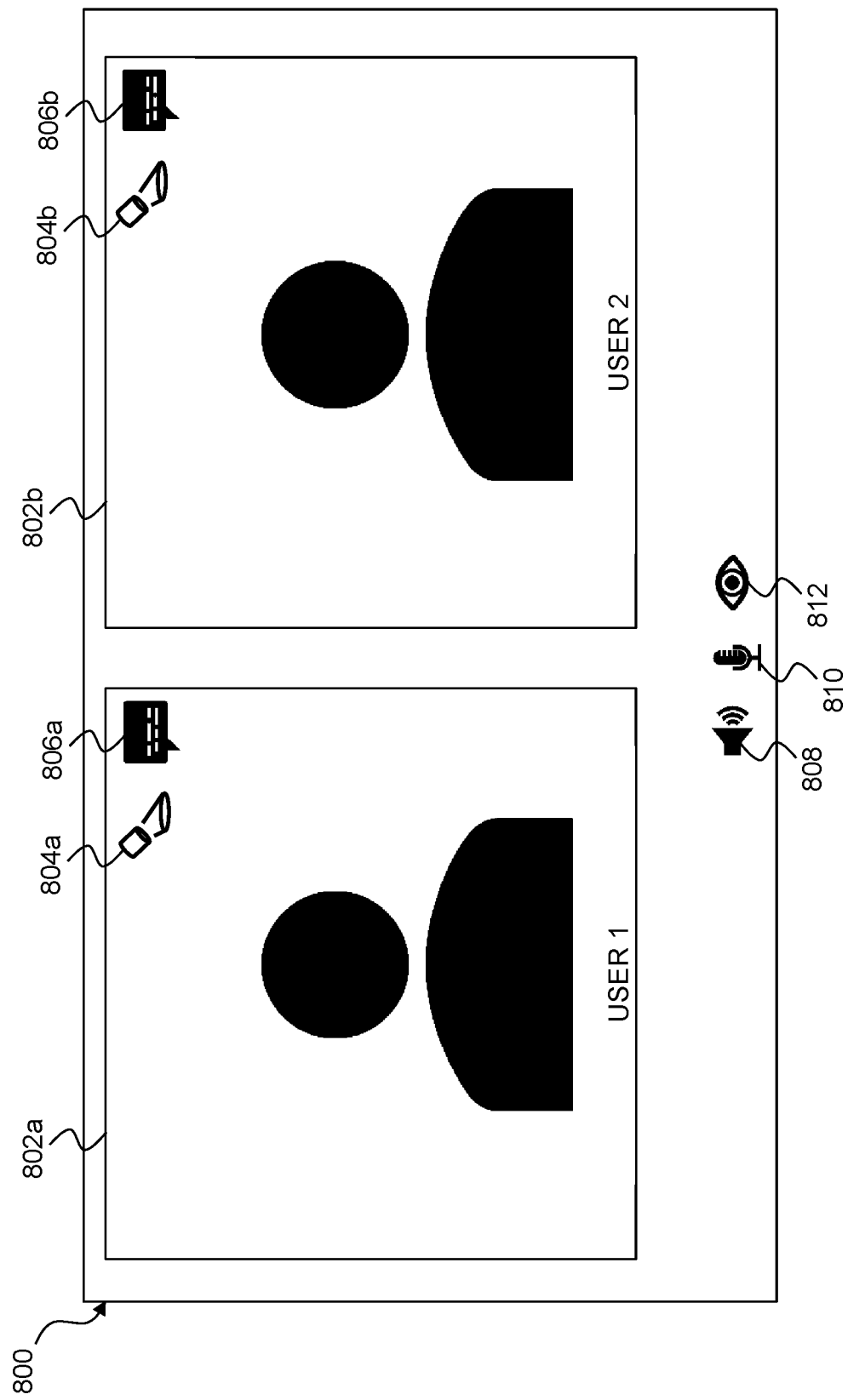
Figure 8B:
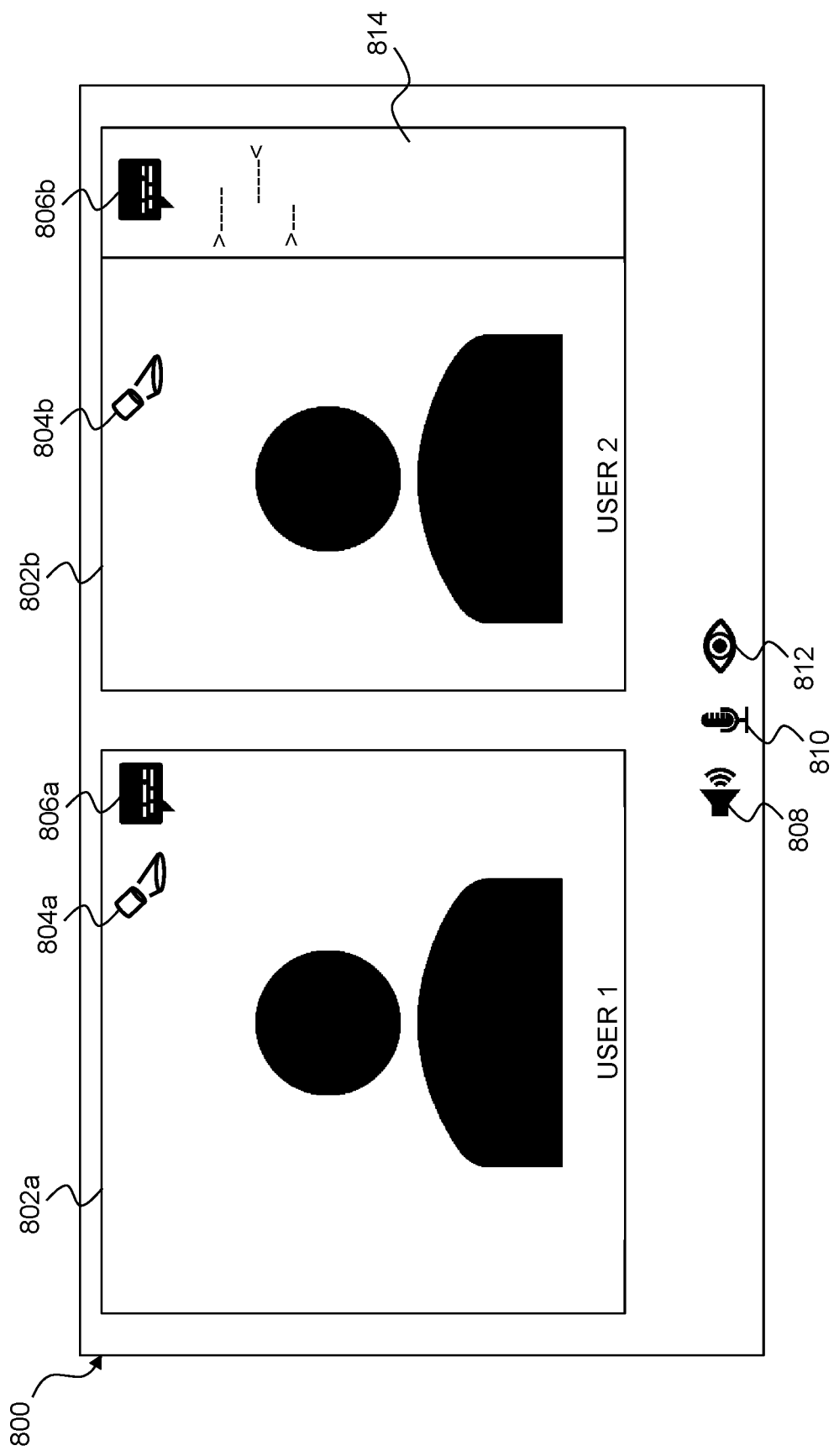

Referring to FIGS. 8A and 8B, one embodiment of a Graphical User Interface (GUI) 800 is illustrated, such as may be displayed on a screen of the client device 104. The GUI 800 includes tiles 802a, 802b for each participant being viewed, as well as spotlight buttons 804a, 804b, and chat buttons 806a, 806b. Actuation of a spotlight button may increase the size of the respective tile, as shown for example with respect to tile 1 of FIG. 10. Actuation of a chat button opens a chat with the participant of the respective tile, as shown for User 2 in FIG. 8B with respect to chat window 814. A volume button 808, a mic button 810, and a video button 812 enable a user of the client device 104 to control various inputs and outputs for the conference call.

Figure 9A:
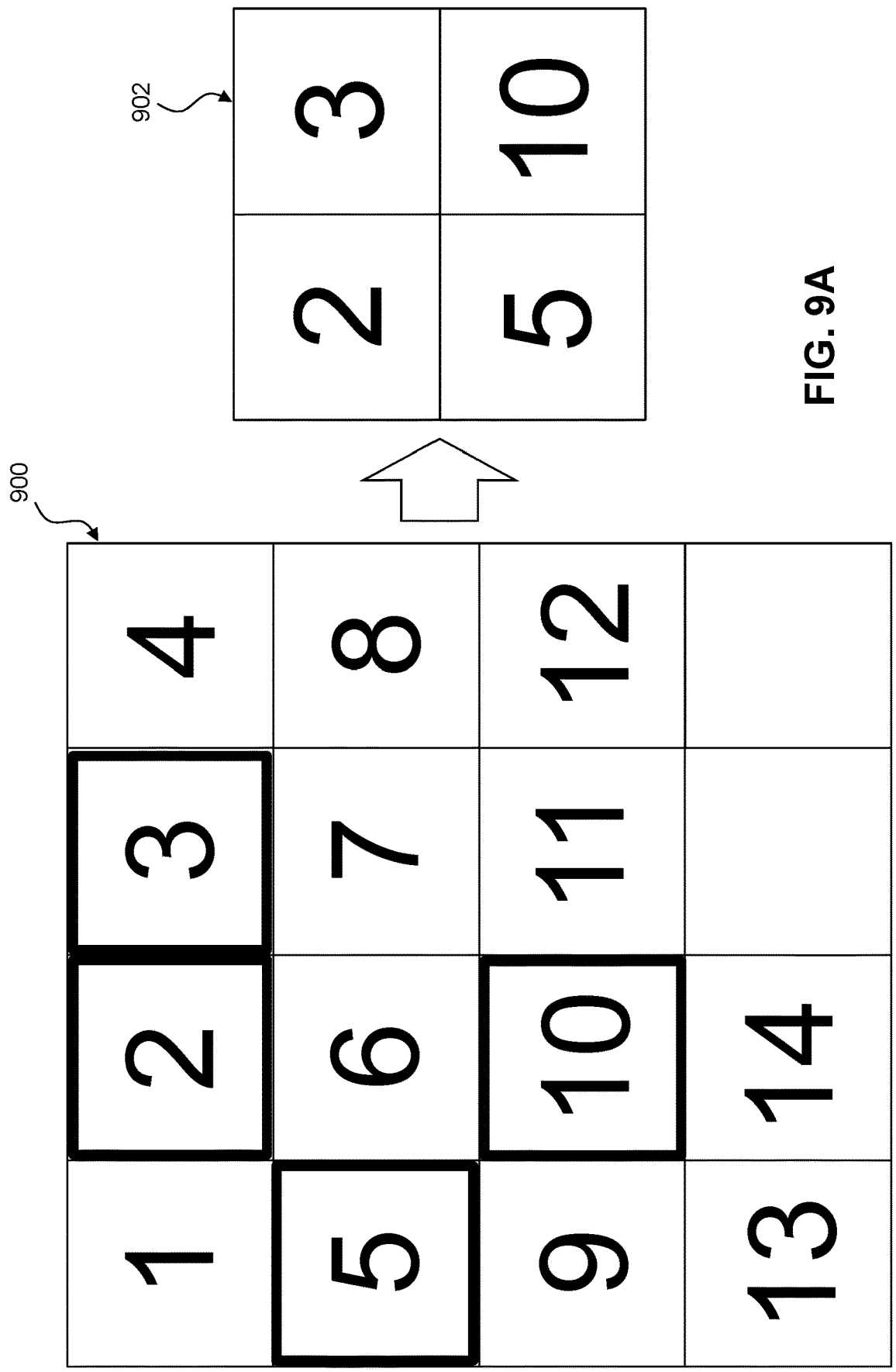

Referring to FIG. 9A, one embodiment of a conference call viewing grid 900 is shown, such as may be displayed on a screen of the client device 104. In addition to scalability and optimization improvements as described above, another benefit of separating the video streams is providing the client devices and the STU 116 with more control over the display seen by each participant. The grid is divided into separate windows, with each window representing a video stream being streamed by another client device (e.g., the client devices 106 and 108) to the server 102, and from the server 102 to the client device 104. Although not shown in FIG. 1, other client devices may also be participants in the conference call, with the present conference involving a total of fifteen devices (e.g., the client device 104 and the fourteen other devices displayed on the grid 900.

In the present example, the grid 900 is displayed via a browser (e.g., using Chrome, Safari, Internet Explorer, Brave, Opera, or a similar browser) without the use of a client-side application or plug-in on the client device 104. It is understood that in other embodiments the present disclosure may be applied to environments in which a client device uses an application or browser plug-in to communicate with the STU 116, and the description of browser only communications is not intended to be limiting.

By relying strictly on the browser's inherent capabilities without the use of applications or plug-ins, the ability to join and participate in the conference call may be available to any client device with a browser. This simplifies joining a conference call, and enables joining even if the client device does not permit the download or installation of applications or browser plug-ins (e.g., due to security restrictions). Furthermore, this provides a level of security to the client device, as there are no downloads to be installed or authorized in order to access the conference call. In addition, as many browsers are widely used and frequently updated for security reasons, the user of the client device need not be concerned about potential application or plug-in flaws that might compromise the client device's security if not updated. In addition, by relying only on the client device's browser, there is less chance of needing an update before joining a conference call, as might happen if an application or a plug-in has not been used for a while. This also enables mobile devices to fully participate in a conference call using only their built-in browser (or another browser that is selected by the user).

To accomplish this browser focused conferencing, the server 102 may rely on a defined framework, such as the WebRTC framework, to provide complete conference functionality. Other technologies may also be supported by the solution, such as the Unified Plan for SDPs as supported by Safari, and/or Plan-B that is supported by Chrome and other platforms. Further support may be provided using a cross-platform JavaScript SDK that is fully featured. It is understood that any suitable framework or technology may be used with the present disclosure, and the selection and use of such frameworks and technologies may depend on a variety of factors and may change over time due to the adoption and/or deprecation of such frameworks and technologies.

Each video stream that is displayed can be manipulated as though it is a thumbnail in a folder, with each video tile in the grid 900 able to be manipulated in various ways individually. Such manipulation may include selecting, moving, resizing, and dragging-and-dropping (e.g., to form a breakout session or to rearrange the display arrangement) the video displayed in one or more tiles. Multi-selection of tiles may be possible (e.g., using Ctrl-Click). Once selected, various actions may be performed on the selected user/video using input devices such as a keyboard, left click/right click mouse menus, and/or buttons in the frame. Furthermore, for an individual video or for all the videos as a whole, a user may be able to zoom in/out and/or scroll to see other participants who are currently not displayed.

To achieve this seamless and intuitive user interface (UI), the solution may use the ability of browsers to manage divs. For example, HTML5 allows floating divs that are placed optimally by the browser, as well as enabling various decorations on a div and the ability to vary the size and position of each of these divs independently. By displaying each video stream as a div, the browser can be used to manipulate these divs.

As shown in FIG. 9A, tiles may be selected from a primary grid 900 by a user to form a breakout session grid 902. The selection may be performed by selecting each participant using the keyboard or mouse (e.g., by Cntl-click), by dragging a set of participants into the breakout session, or in other ways (e.g., by selecting and dragging using a touchscreen). In the present example, selected tiles may be outlined as demonstrated by tiles 2, 3, 5, and 10. When this is done, the breakout session may start relatively quickly or between these breakout sessions.

Figure 9B:
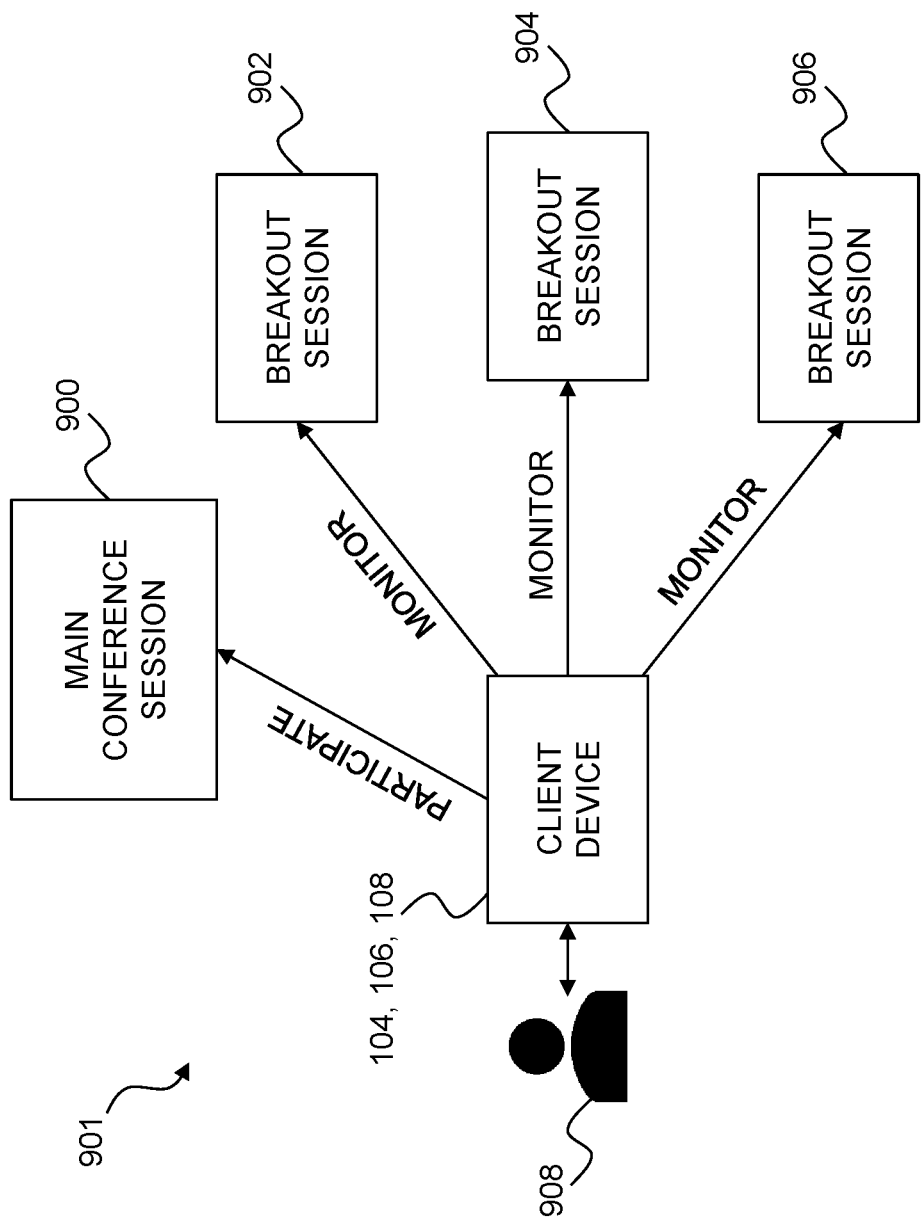
FIG. 9B illustrates an embodiment of an environment in which a user may participate in a conference session while monitoring breakout sessions.

With additional reference to FIG. 9B, one embodiment of an environment 901 illustrates the host and/or other participants 908 using the client device 104 (or another client device) to view and/or hear a breakout session 902, 904, or 906 simply by mousing over or otherwise selecting (e.g., by pressing on a touchscreen) the grid representing that session. For example, assume that multiple breakout sessions 902, 904, and 906 have been formed from the main grid participants. The host may hover their mouse over each breakout session to hear the audio from that session and/or see the video without actually having to join the session themselves. This means the host can remain in the larger conference grid while still monitoring the individual breakout sessions. It is understood that, in some embodiments, a participant in a breakout session may be able to monitor the other breakout sessions and/or the main conference session.

Figure 10:
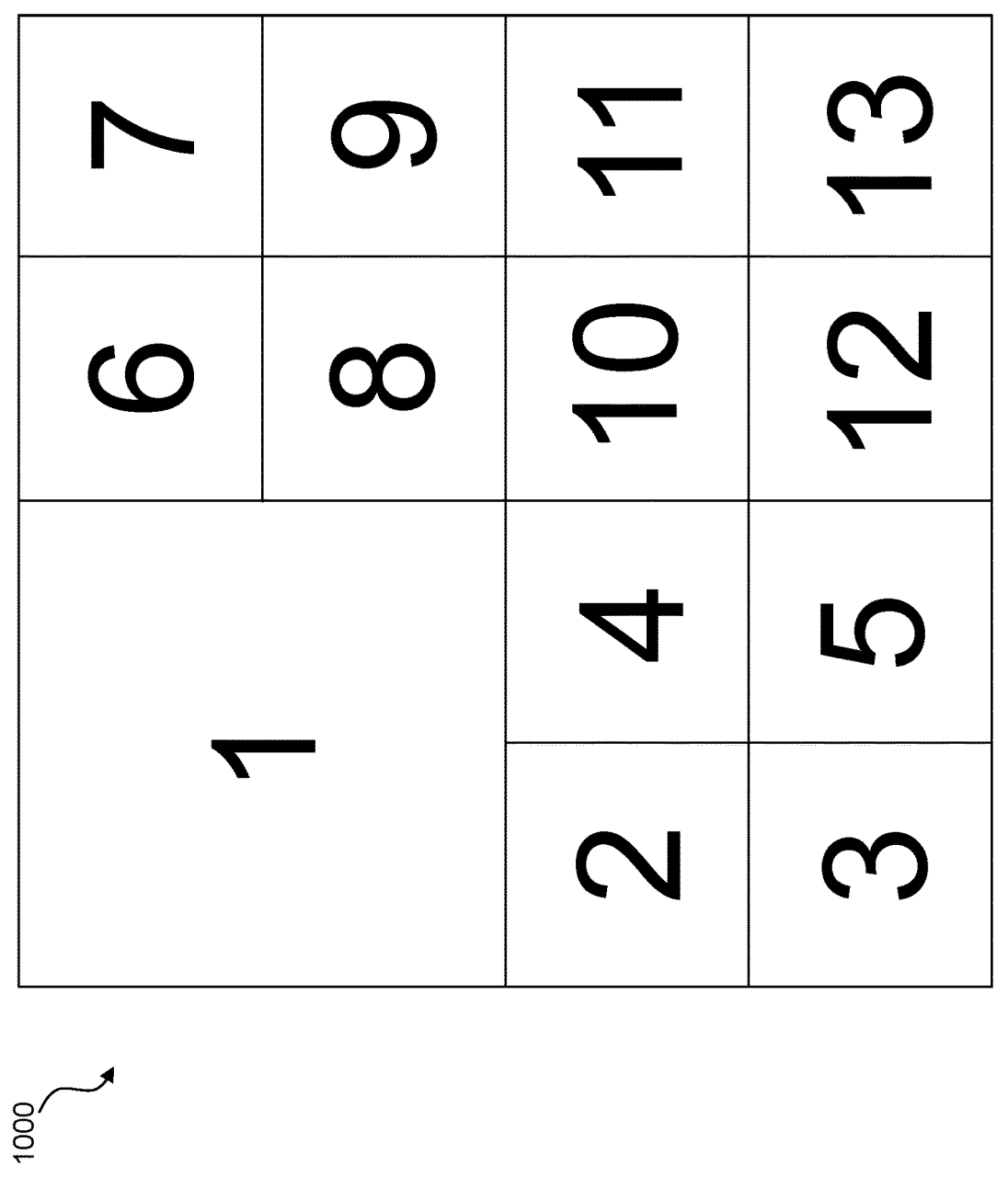

Referring to FIG. 10, another embodiment of a conference call viewing grid 1000 is shown, such as may be displayed on a screen of the client device 104. In the present example, the grid 1000 may be customized by each participant as they see fit. For example, each participant may select the video streams they want to see in their grid (e.g., "pinned" to their view), which video streams should be larger (e.g., tile 1), etc., and the other videos tiles may be automatically filled in and flow around their preferences.

Figures 11A, 11B:
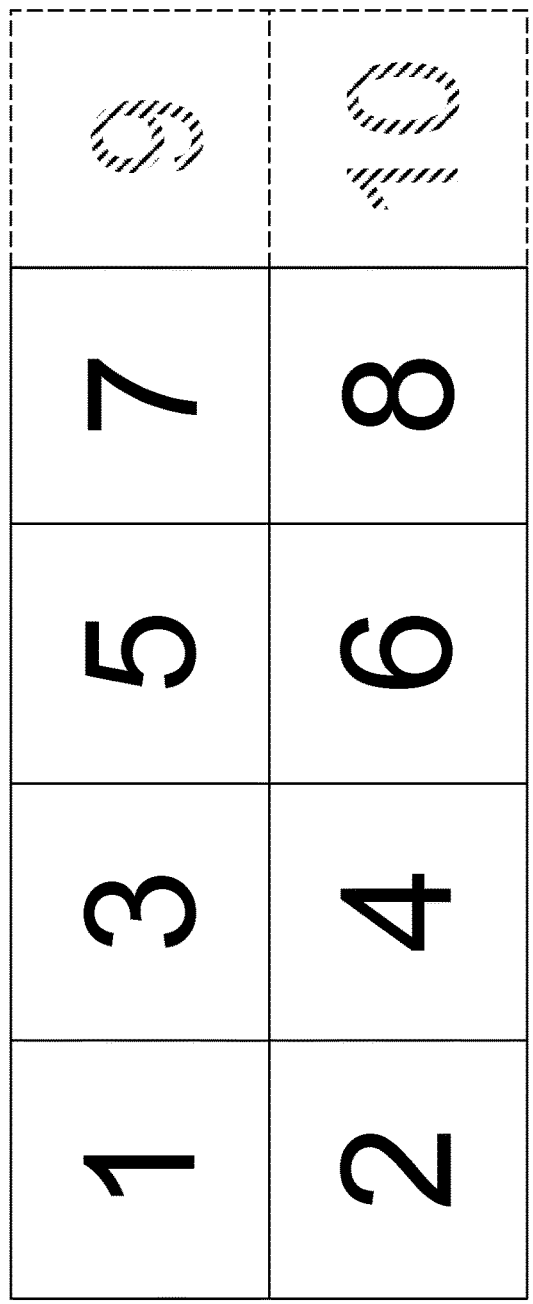

Referring to FIGS. 11A and 11B, another embodiment of a conference call viewing grid 1100 is shown, such as may be displayed on a screen of the client device 104. In the present example, the tiles in the grid 1100 may be moved to show other tiles. For example, in a conference call with many participants, a single grid view may only show a portion of the participants. By changing the tiles in the grid (e.g., by scrolling left/right/up/down/diagonally, swiping, zooming out, and/or otherwise manipulating the viewable tiles), previously unseen participants may be viewed.

If the user wants a particular tile or tiles to remain on the grid for viewing, those tiles may be "pinned" to prevent them from moving. This is shown in FIG. 11B, with tile 1 remaining on the screen after other tiles have been moved. In FIG. 11B, a partial replacement has occurred, with tile 8 still being shown. In FIG. 11C, a complete replacement has occurred (other than pinned tile 1), even though an empty tile is now present. If additional participants were available, the empty tile may be replaced by tile 15. In FIG. 11D, the pinned tile 1 has been moved to another location and the replacement tiles move around the new location.

It is understood that many different arrangements of tiles may be used, with different grid sizes and shapes, different numbering orders for tiles, different replacement patterns, and other variations. Accordingly, the examples provided herein are for purposes of illustration only and are not intended to be limiting.

Figure 12:
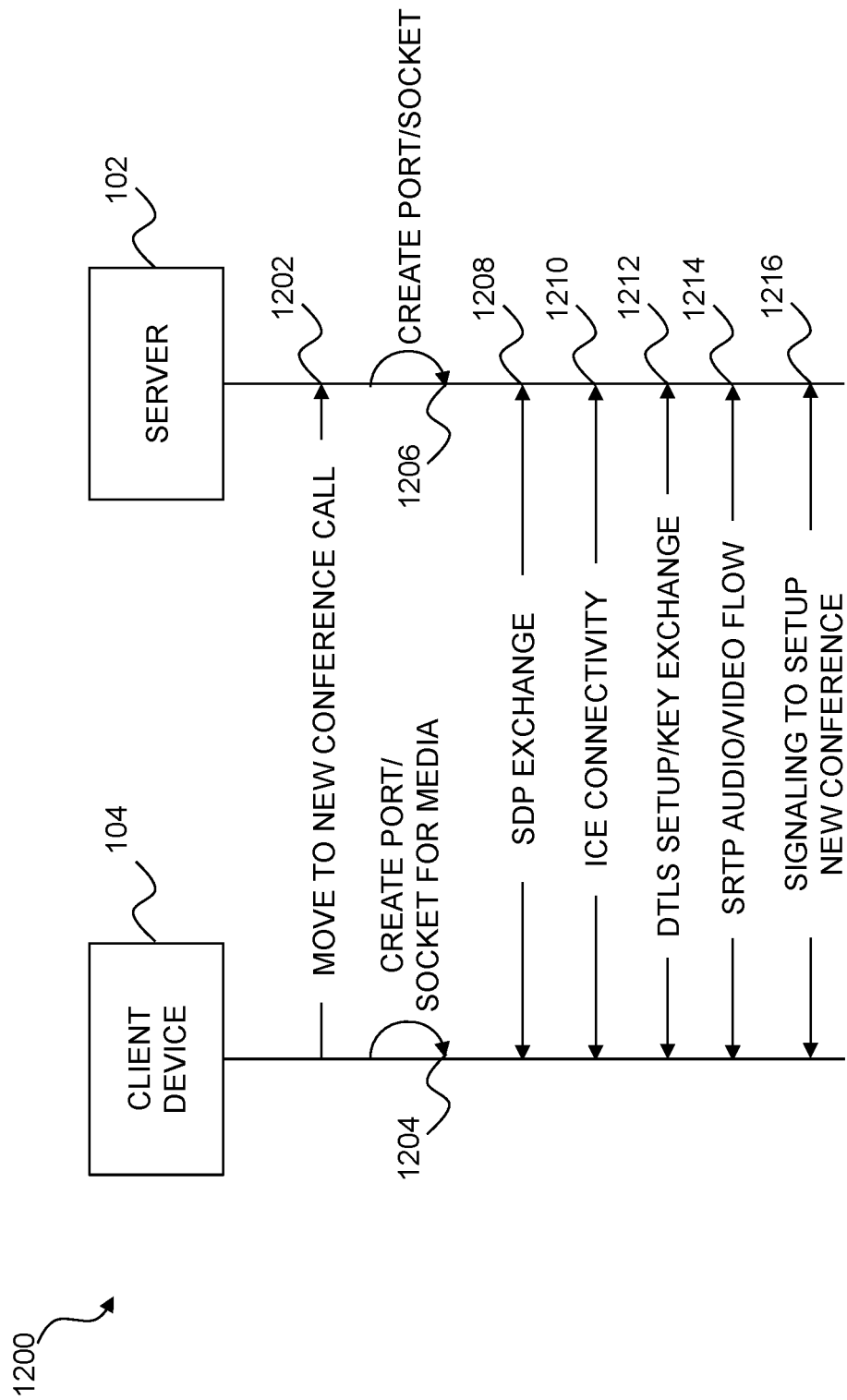
FIGS. 12-14 illustrate embodiments of media and signaling connections, with FIGS. 13 and 14 illustrating connections that may occur within the environment of FIG. 1, and FIG. 12 illustrating a conventional approach to the message flow of FIG. 13.

Referring to FIG. 12, a sequence diagram illustrates one embodiment of a conventional message flow 1200 that may be executed within the environment 100 of FIG. 1 when the client device 104 wants to move from one conference call on the STU 116 to another conference call on the same STU. Accordingly, in step 1202, the client device 104 sends a message to the server 102 indicating that the client device 104 wants to move to a new conference call. In steps 1204 and 1206, respectively, the client device 104 and the server 102 create ports/sockets. In step 1208, a Session Description Protocol (SDP) exchange occurs. In step 1210, Interactive Connectivity Establishment (ICE) connectivity occurs. In step 1212, there is a Datagram Transport Layer Security (DTLS) setup/key exchange. In step 1214, Secure Real-Time Transport Protocol (SRTP) audio/video flow begins. In step 1216, signaling occurs to setup the new conference.

The message flow 1200 is generally inefficient because Real-Time Transport Protocol (RTP) establishment takes a non-trivial amount of time (e.g., two to five seconds) to complete the following: (1) gather candidates; (2) exchange initial candidates through SDP exchange over a signaling channel; (3) manage ICE connectivity; and (4) perform DTLS channel setup and key exchange. In this model, when a user is moved to a different conference, the RTP is torn down and re-established, which slows down the user experience.

Figure 13:
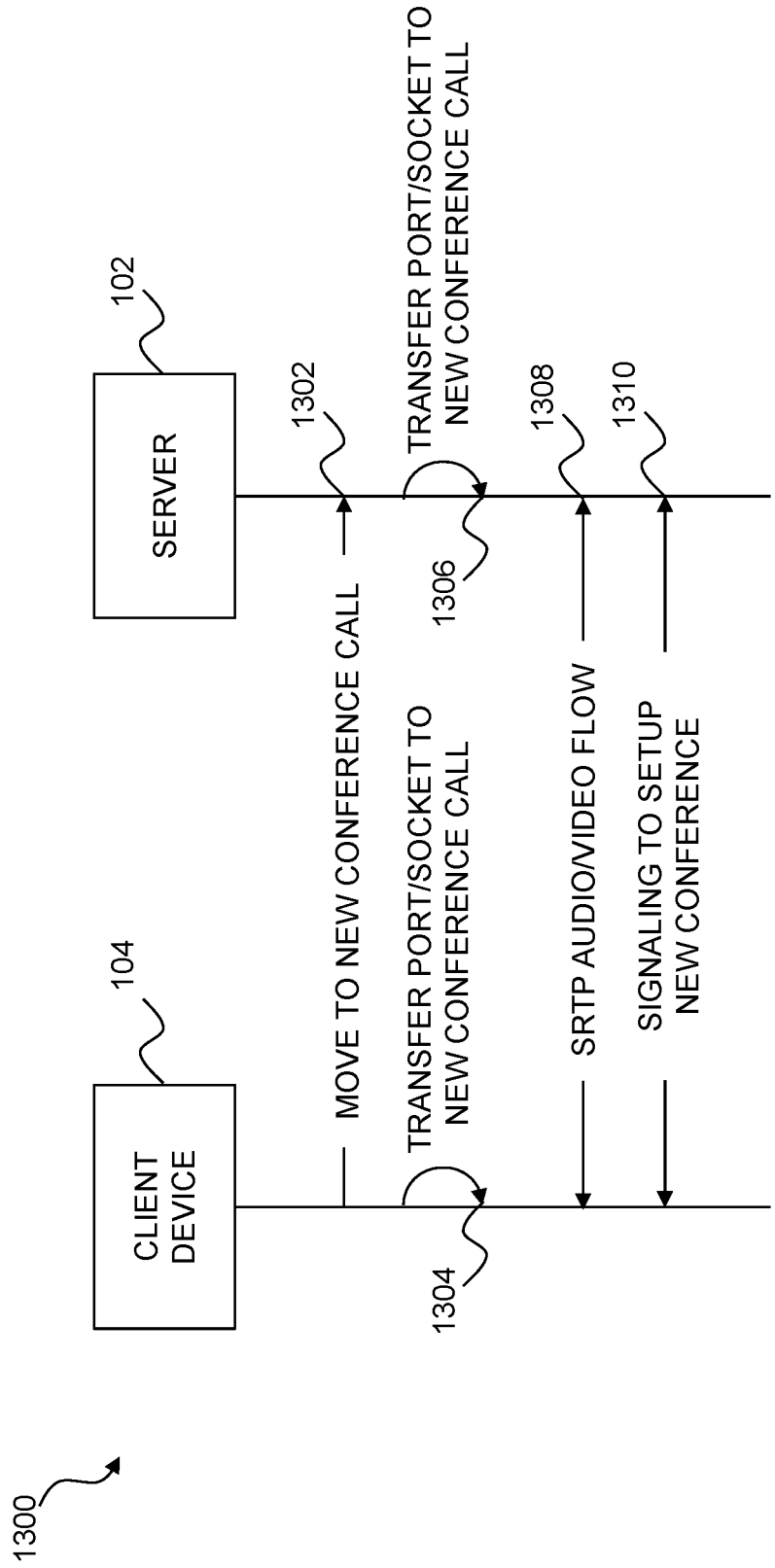

Referring to FIG. 13, a sequence diagram illustrates one embodiment of a message flow 1200 that may be executed within the environment 100 of FIG. 1 when the client device 104 wants to move from one conference call on the STU 116 to another conference call on the same STU. However, in this model, the same media channels are retained, which means the time needed to switch between conference calls may be sped up. For example, the switch may take from twenty to fifty milliseconds rather than the other model's two to five seconds if the conferences are hosted on the same STU server and one hundred to two hundred milliseconds if the conferences are hosted on different STU servers connected through the same Traversal Using Relay around NAT (TURN) server.

Accordingly, in step 1302, the client device 104 sends a message to the server 102 indicating that the client device 104 wants to move to a new conference call. In steps 1304 and 1306, respectively, the client device 104 and the server 102 transfer the existing ports/sockets to the new conference call. In step 1308, SRTP audio/video flow begins. In step 1310, signaling occurs to setup the new conference.

This model also provides the capability to switch one media (e.g., audio) to a different conference call while keeping other media (e.g., video and other sessions) with the original conference call. This enables participants to view video of a conference call while holding a side conversation via another conference call, all using the same browser-based interface.

Figure 14:
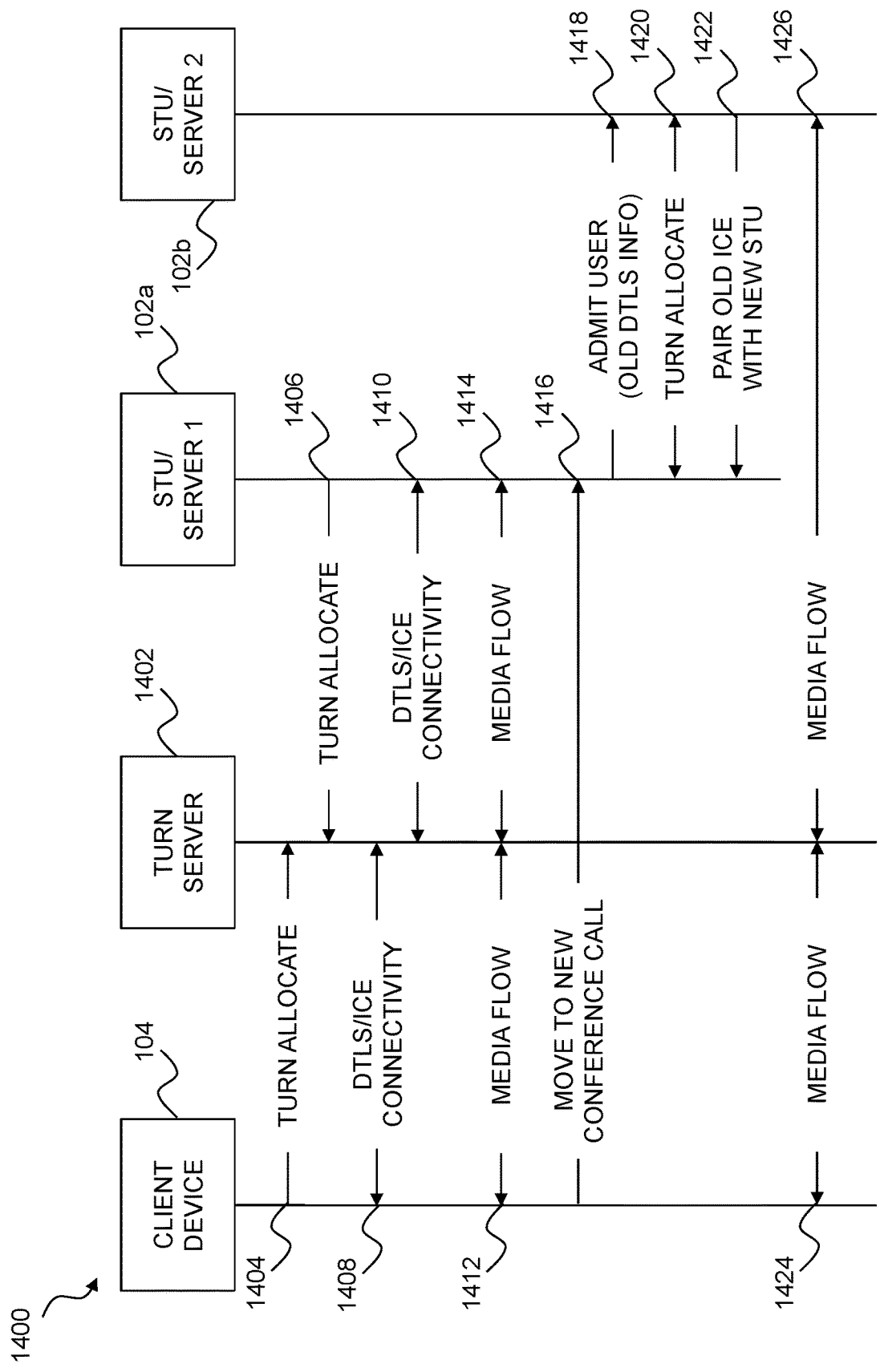

Referring to FIG. 14, a sequence diagram illustrates one embodiment of a message flows 1200 that may be executed within the environment 100 of FIG. 1 when the client device 104 wants to move from one conference call on one STU (server 102a) to another conference call on another server 102b. As shown, this may be accomplished by passing the negotiated DTLS key information to the new server 102b and informing a TURN server 1402 to accept the ICE/media exchanges from the new server.

Accordingly, in steps 1404 and 1406, respectively, the client device 104 and server 102a send TURN allocate messages to the TURN server 1402. In steps 1408 and 1410, respectively, the client device 104 and server 102a establish DTLS/ICE connectivity with the TURN server 1402. In steps 1412 and 1414, media flow begins between the client device 104 and server 102a via the TURN server 1402. In step 1416, the client device 104 sends a message to the server 102a indicating that the client device 104 wants to move to a new conference call on the server 102b.

In step 1418, the server 102a sends a message to the server 102b requesting admittance of the client device 104 using the original DTLS information. In step 1420, TURN allocation occurs between the servers 102a and 102b. In step 1422, the previous ICE is paired with the new STU of the server 102b. In steps 1424 and 1426, media flow begins between the client device 104 and server 102b via the TURN server 1402.

This model enables a number of features such as fast seamless breakout sessions. Another enabled feature may provide events with multiple conferences where people can hover over a conference to temporarily see the video and hear audio. Participants may do a virtual walk over the floor experiencing the difference conferences. The participant may also be a potential collaborator. Still another enabled feature may provide split audio and video that allows a participant to temporarily hear what is going on in another conference. This may be useful in breakout sessions. In such cases, the video may still be with main conference, but the audio split enables the participant to temporarily listen to a breakout session.

In other embodiments (not necessarily associated with FIG. 14), another enabled feature may provide a private audio session with another user in a conference while the video is still exchanged with the overall conference. Yet another enabled feature may provide for a public announcement (PA) system, such as where a principal can make an announcement that goes to all classroom conferences in a virtual school.

Figure 15:
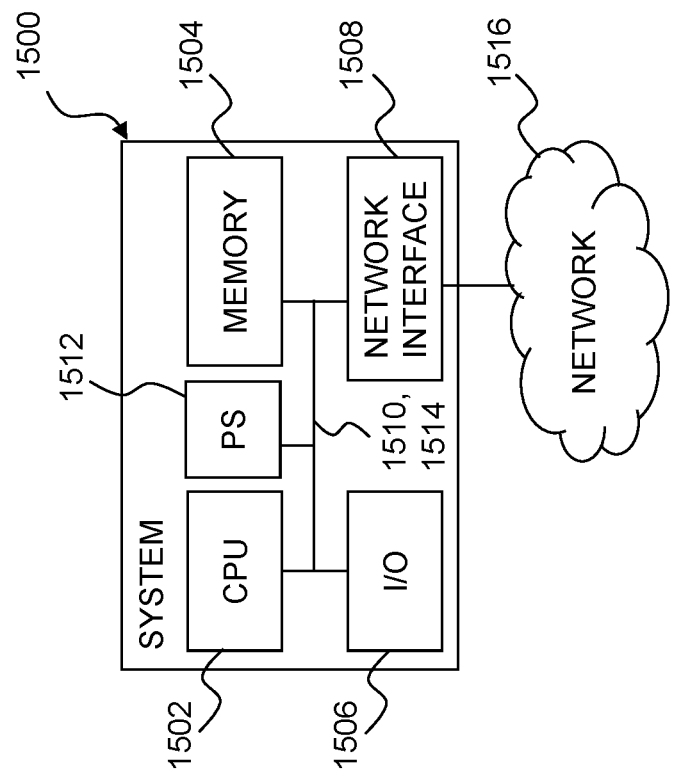
FIG. 15 is a simplified diagram of one embodiment of a computer system that may be used in embodiments of the present disclosure as a client device or a server.

Referring to FIG. 15, one embodiment of a computer system 1500 is illustrated. The computer system 1500 is one possible example of a system component or computing device such as the client device 104, 106, or 108, or the server 102 of FIG. 1. The computer system 1500 may include a controller (e.g., a central processing unit ("CPU")) 1502, a memory unit 1504, an input/output ("I/O") device 1506, and a network interface 1508. The components 1502, 1504, 1506, and 1508 are interconnected by a transport system (e.g., a bus) 1510. A power supply (PS) 1512 may provide power to components of the computer system 1500, such as the CPU 1502 and memory unit 1504. It is understood that the computer system 1500 may be differently configured and that each of the listed components may actually represent several different components. For example, the CPU 1502 may actually represent a multi-processor or a distributed processing system; the memory unit 1504 may include different levels of cache memory, main memory, hard disks, and remote storage locations; the I/O device 1506 may include monitors, keyboards, and the like; and the network interface 1508 may include one or more network cards providing one or more wired and/or wireless connections to a network 1516. Therefore, a wide range of flexibility is anticipated in the configuration of the computer system 1500.

The computer system 1500 may use any operating system (or multiple operating systems), including various versions of operating systems provided by Microsoft (such as WINDOWS), Apple (such as iOS or Mac OS X), Google (Android), UNIX, and LINUX, and may include operating systems specifically developed for handheld devices, personal computers, and servers depending on the use of the computer system 1500. The operating system, as well as other instructions (e.g., for the processes and message sequences described herein), may be stored in the memory unit 1504 and executed by the processor 1502. For example, if the computer system 1500 is the server 102 or a client device 104, 106, 108, the memory unit 1504 may include instructions for performing some or all of the message sequences and methods described with respect to such devices in the present disclosure.

The network 1516 may be a single network or may represent multiple networks, including networks of different types. For example, the server 102 or a client device 104, 106, 108 may be coupled to a network that includes a cellular link coupled to a data packet network, or data packet link such as a wide local area network (WLAN) coupled to a data packet network. Accordingly, many different network types and configurations may be used to establish communications between the server 102, client devices 104, 106, 108, servers, and/or other components described herein.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

Communication among the server 102, client devices 104, 106, 108, servers, and/or other components described herein may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP), File Transfer Protocol (FTP), and/or Hyper-Text Transfer Protocol (HTTP). A sharing session and other communications as described herein may be connection-based (e.g., using a protocol such as the transmission control protocol/internet protocol (TCP/IP)) or connection-less (e.g., using a protocol such as the user datagram protocol (UDP)). It is understood that various types of communications may occur simultaneously, including, but not limited to, voice calls, instant messages, audio and video, emails, document sharing, and any other type of resource transfer, where a resource represents any digital data.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for managing a conference call using a selective transmission unit (STU) to manage a plurality of client devices participating in the conference call, the method comprising:
   receiving, by a selective transmission unit (STU), video transmission parameters from each of a plurality of client devices;
   receiving, by the STU, video reception parameters from each of the client devices;
   instructing, by the STU, a first client device of the plurality of client devices to start transmitting a first video stream at a first resolution based on at least some of the video transmission parameters and the video reception parameters;
   receiving, by the STU, the first video stream;
   forwarding the first video stream to at least a second client device of the client devices based on the video reception parameters of the second client device;
   receiving, by the STU, a modification of the video reception parameters from the second client device, wherein the modification requests a second video stream having a second resolution from the first client device;
   determining, by the STU, that the second video stream is already being received from the first client device; and
   forwarding the second video stream to the second client device.

2. The method of claim 1, further comprising:
   determining, by the STU, that a third video stream from a third client device is not being viewed by any of the other client devices; and
   instructing, by the STU, the third client device to stop sending the third video stream.

3. The method of claim 1, further comprising:
   determining, by the STU, that a third video stream having a third resolution is desired from the first client device;
   instructing, by the STU, the first client device to start transmitting the third video stream;
   receiving, by the STU, the third video stream; and
   forwarding the third video stream to at least one of the other client devices based on the video reception parameters of the respective client device.

4. The method of claim 3, further comprising determining, by the STU, that the third video stream is not being received from the first client device prior to instructing the first client device to start transmitting the third video stream.

5. The method of claim 3, wherein determining that the third video stream having the third resolution is desired from the first client device occurs when a request for the third resolution is received from one of the other client devices.

6. The method of claim 1, further comprising:
   monitoring, by the STU, a network performance level associated with the first client device; and
   modifying, by the STU, at least one of a video stream being received from the first client device or a video stream being sent to the first client device based on the network performance level.

7. The method of claim 1, wherein the STU manages the conference call by communicating only with a browser on each of the client devices, and wherein the client devices do not communicate with the STU using an application other than the browser and do not use any browser plug-ins to communicate with the STU for the conference call.

8. A method for managing a conference call using a selective transmission unit (STU) to manage a plurality of client devices participating in the conference call, the method comprising:
   receiving, by a selective transmission unit (STU), video transmission parameters and video reception parameters from each of a plurality of client devices;
   managing, by the STU, a plurality of video streams received by the STU from the client devices, wherein the managing includes controlling a resolution of each video stream being received from the client devices based on the video transmission parameters and video reception parameters; and
   managing, by the STU, which of the received video streams are sent to each of the client devices based on the video reception parameters of the respective client device,
   wherein the STU communicates with at least one of the client devices for the conference call using only a browser present on the client device, and wherein the client device does not communicate with the STU using an application other than the browser and does not use any browser plug-ins to communicate with the STU for the conference call.

9. The method of claim 8, wherein managing the plurality of video streams received by the STU from the client devices includes instructing at least one of the client devices to stop sending a video stream having a particular resolution.

10. The method of claim 8, wherein managing the plurality of video streams received by the STU from the client devices includes instructing at least one of the client devices to start sending a video stream having a particular resolution.

11. The method of claim 8, further comprising:
    monitoring, by the STU, a network performance level associated with a first client device of the client devices; and
    modifying, by the STU, at least one of a video stream being received from the first client device or a video stream being sent to the first client device based on the network performance level.

12. The method of claim 8, further comprising:
    receiving, by the STU, a change in the video reception parameters of a first client device of the client devices; and
    modifying, by the STU, a video stream being sent to the first client device based on the change.

13. A system for managing a conference call, the system comprising:
    a server having a processor and a memory coupled to the processor, the memory containing a plurality of instructions for execution by the processor, the instructions including instructions for providing a selective transmission unit (STU) and configuring the STU for:
- receiving video transmission parameters and video reception parameters from each of a plurality of client devices;
- managing a plurality of video streams received by the STU from the client devices, wherein the managing includes controlling a resolution of each video stream being received from the client devices based on the video transmission parameters and video reception parameters; and
- managing which of the received video streams are sent to each of the client devices based on the video reception parameters of the respective client device,
- wherein the STU is configured to communicate with at least one of the client devices for the conference call using only a browser present on the client device, and wherein the client device does not communicate with the STU using an application other than the browser and does not use any browser plug-ins to communicate with the STU for the conference call.

14. The system of claim 13, wherein the instructions for managing the plurality of video streams received by the STU from the client devices include instructions for instructing at least one of the client devices to stop sending a video stream having a particular resolution.

15. The system of claim 13, wherein the instructions for managing the plurality of video streams received by the STU from the client devices include instructing at least one of the client devices to start sending a video stream having a particular resolution.

16. The system of claim 13, further including instructions for:
- monitoring, by the STU, a network performance level associated with a first client device of the client devices; and
- modifying, by the STU, at least one of a video stream being received from the first client device or a video stream being sent to the first client device based on the network performance level.

17. The system of claim 13, further including instructions for:
- receiving, by the STU, a change in the video reception parameters of a first client device of the client devices; and
- modifying, by the STU, a video stream being sent to the first client device based on the change.

* * * * *